(12) United States Patent
Hayashida

(10) Patent No.: US 9,474,971 B2
(45) Date of Patent: Oct. 25, 2016

(54) EMULATION AND FACILITATION OF PURCHASE OF GAME PROGRAMS

(71) Applicant: NINTENDO CO., LTD., Kyoto (JP)

(72) Inventor: Koichi Hayashida, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 130 days.

(21) Appl. No.: 14/138,937

(22) Filed: Dec. 23, 2013

(65) Prior Publication Data

US 2015/0080120 A1    Mar. 19, 2015

(30) Foreign Application Priority Data

Sep. 18, 2013  (JP) ................................ 2013-193421

(51) Int. Cl.
| | | |
|---|---|---|
| A63F 13/00 | (2014.01) | |
| A63F 13/48 | (2014.01) | |
| A63F 13/73 | (2014.01) | |
| A63F 13/792 | (2014.01) | |
| A63F 13/77 | (2014.01) | |

(52) U.S. Cl.
CPC ............... *A63F 13/48* (2014.09); *A63F 13/73* (2014.09); *A63F 13/77* (2014.09); *A63F 13/792* (2014.09); *A63F 2300/209* (2013.01)

(58) Field of Classification Search
USPC ..................................................... 463/25–43
See application file for complete search history.

(56) References Cited

U.S. PATENT DOCUMENTS

| | | | |
|---|---|---|---|
| 6,267,677 B1 * | 7/2001 | Tajiri et al. ..................... 463/43 |
| 2001/0029205 A1 * | 10/2001 | Taho et al. ..................... 463/43 |
| 2001/0031665 A1 * | 10/2001 | Taho et al. ..................... 463/43 |
| 2007/0060345 A1 * | 3/2007 | Edwards .......................... 463/31 |
| 2007/0060346 A1 * | 3/2007 | Edwards .......................... 463/31 |
| 2007/0087798 A1 * | 4/2007 | McGucken ...................... 463/1 |
| 2009/0011838 A1 * | 1/2009 | Miyamoto ...................... 463/43 |
| 2010/0256971 A1 * | 10/2010 | Tisserand et al. ............. 703/21 |
| 2012/0079126 A1 * | 3/2012 | Evans et al. .................. 709/230 |
| 2014/0179427 A1 * | 6/2014 | Miura et al. ................... 463/31 |
| 2014/0179439 A1 * | 6/2014 | Miura et al. ................... 463/42 |

FOREIGN PATENT DOCUMENTS

| | | |
|---|---|---|
| JP | 2001-340640 | 12/2001 |
| JP | 2009-011569 | 1/2009 |

* cited by examiner

*Primary Examiner* — Masud Ahmed
(74) *Attorney, Agent, or Firm* — Nixon & Vanderhye, P.C.

(57) ABSTRACT

An example recording medium records an information processing program causing an information processing apparatus to operate as: a reading part reading a game program capable of being executed by any other information processing apparatus having a configuration different from that of the information processing apparatus; an emulation part emulating the read-out game program; a restriction part restricting the emulation of the game program by the emulation part; and a link information presentation part presenting link information used for accepting a purchase request for the game program, in a manner of being in correspondence to the game to be emulated.

11 Claims, 22 Drawing Sheets

F I G. 2
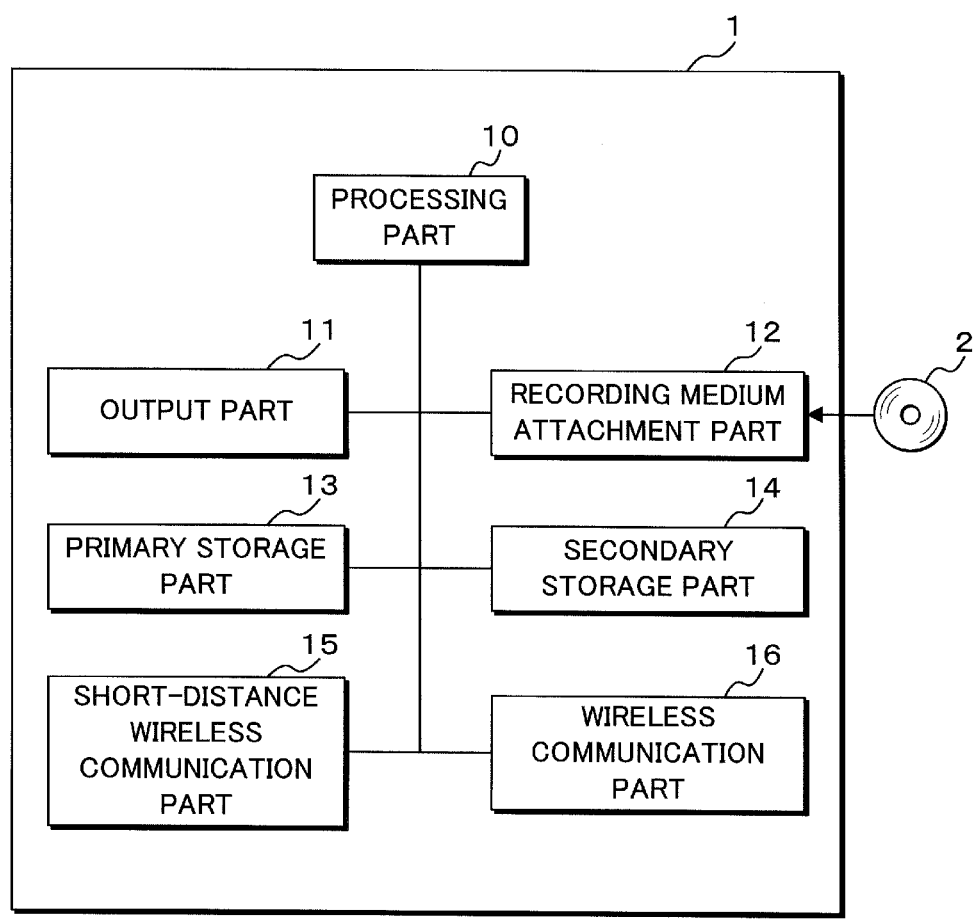

F I G. 1 2
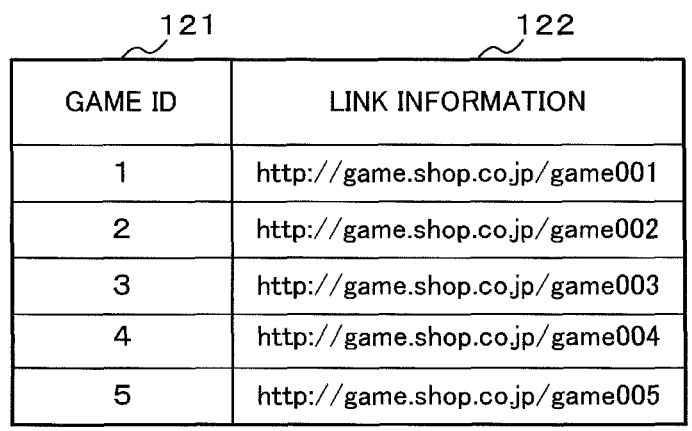

F I G. 1 3
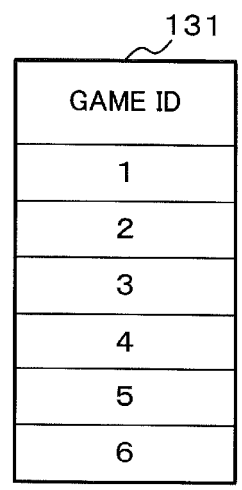

FIG. 20

| | 201 | 202 | 203 | 204 |
|---|---|---|---|---|
| | GAME ID | PLAYER ID | START DATE AND TIME | END DATE AND TIME |
| | 1 | P001 | 2013/8/16 14:00 | 2013/8/16 14:13 |
| | 1 | P002 | 2013/8/5 16:30 | 2013/8/5 17:01 |
| | 5 | P001 | 2013/8/16 13:45 | 2013/8/16 14:00 |
| | 6 | P001 | 2013/8/16 14:20 | 2013/8/16 15:00 |

EMULATION AND FACILITATION OF PURCHASE OF GAME PROGRAMS

CROSS-REFERENCE TO RELATED APPLICATIONS

This application is based upon and claims the benefit of priority of the prior Japanese Patent Application No. 2013-193421, filed on Sep. 18, 2013, the entire contents of which are incorporated herein by reference.

FIELD

The technology herein relates to a recording medium, an information processing apparatus, an information processing system, and an information processing method for emulating a game program.

BACKGROUND AND SUMMARY

With the progress of computer technology in recent years, the processing speeds and the performance of CPUs (Central Processing Units) are increasing. In association with this, game machines employing such new CPUs have been developed. Such game machines of new types have different configurations from old type machines. Thus, game programs for old type machines are not allowed to run on new-type machines. Accordingly, an emulator has been proposed for allowing game programs for game machines of old types to run on game machines of new types.

According to an aspect of the embodiment, a recording medium records an information processing program causing an information processing apparatus to operate as: a reading part reading a game program capable of being executed by any other information processing apparatus having a configuration different from that of the information processing apparatus; an emulation part emulating the read-out game program; a restriction part restricting the emulation of the game program by the emulation part; and a link information presentation part presenting link information used for accepting a purchase request for the game program, in a manner of being in correspondence to the game to be emulated.

The object and advantages of the invention will be realized and attained by means of the elements and combinations particularly pointed out in the claims. It is to be understood that both the foregoing general description and the following detailed description are exemplary and explanatory and are not restrictive of the invention.

These and other objects, features, aspects and advantages of the present technology will become more apparent by the following detailed explanation in reference to the accompanying drawings.

BRIEF DESCRIPTION OF THE DRAWINGS

FIG. 2 shows a block diagram illustrating a hardware configuration of a game machine according to Embodiment 1.

FIG. 12 shows an explanation diagram illustrating a record layout of a link information table of a web page.

FIG. 13 shows an explanation diagram illustrating a record layout of a purchase situation table.

FIG. 20 shows an explanation diagram illustrating a record layout of a history information table.

DETAILED DESCRIPTION OF NON-LIMITING EXAMPLE EMBODIMENTS

Embodiment 1

An embodiment is described below with reference to the drawings. A game machine according to Embodiment 1 executes partly one or a plurality of game programs. Since a plurality of games are allowed to be enjoyed, this function is referred to as a game mix.

Figure 1:
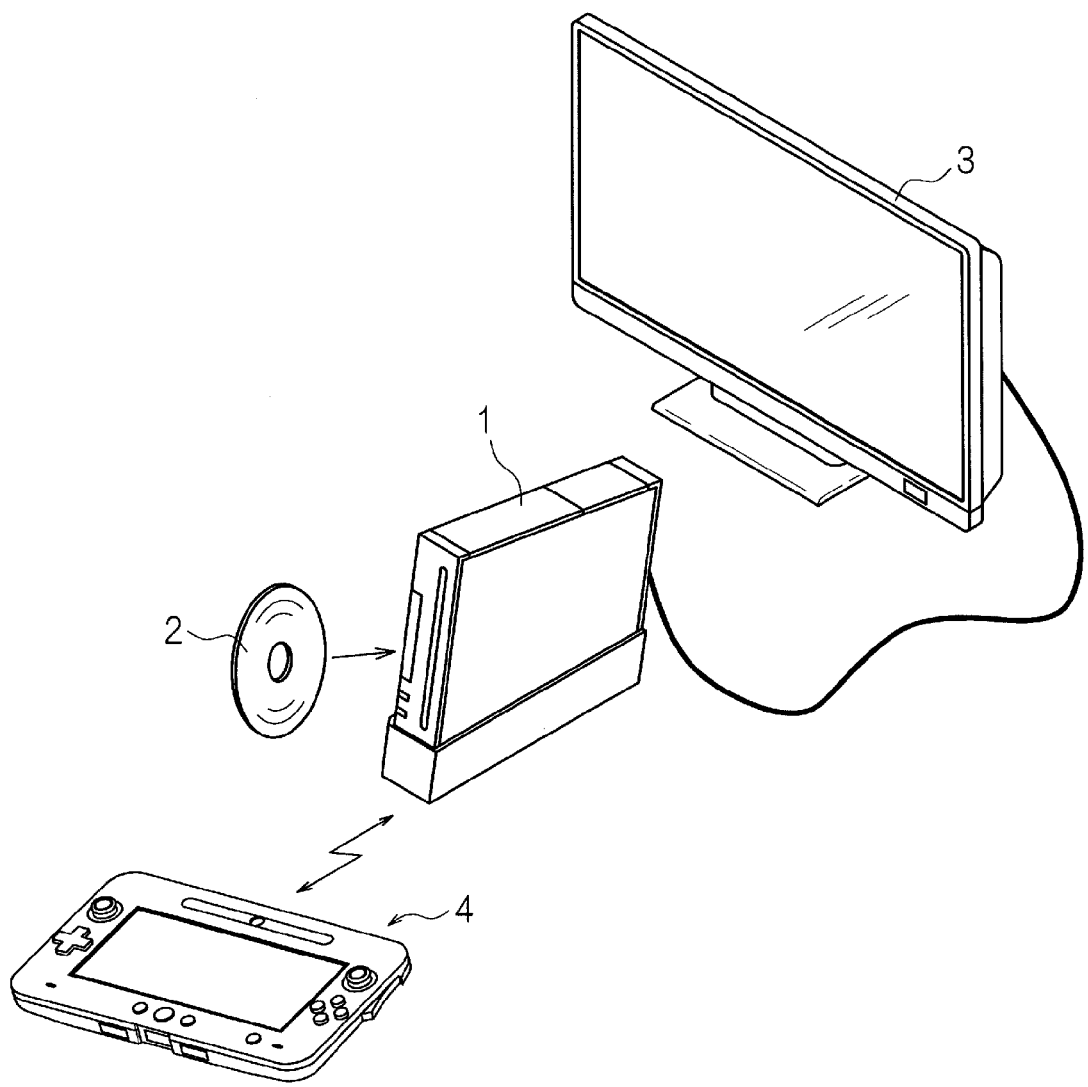
FIG. 1 shows an explanation diagram illustrating a configuration of a game system according to Embodiment 1.

FIG. 1 shows an explanation diagram illustrating the configuration of a game system according to Embodiment 1. The game system includes a game machine 1, a recording medium 2, a display 3 such as a television receiver, and a controller 4. The game machine 1 reads and executes information processing programs stored in the recording medium 2 or the like so as to perform game processing. In the present embodiment, these information processing programs include a management program, an emulation program, and a game program. Further, the game processing indicates processing performed by the game program.

The game machine 1 is connected to the display 3 through a connecting cable. The display 3 displays a game image obtained in the game processing executed by the game machine 1. Further, the display 3 includes a speaker. Then, the speaker outputs game sound obtained as a result of game processing.

The controller 4 is an operation device used by a user. The controller 4 performs communication with the game machine 1, for example, by using a short-distance wireless communication technique such as Bluetooth (registered trademark). The controller 4 receives operation input performed by a player through a cross key, an analog stick, push buttons, a touch panel, or the like and then transmits such operation information to the game machine 1. Further, the controller 4 may include a display part, a speaker, and a microphone. Then, the controller 4 may display the image displayed on the display 3 or alternatively may display an image different from that displayed on the display 3. As for sound, similarly, the same sound as that outputted from the built-in speaker of the display 3 may be outputted from the speaker of the controller 4 or alternatively dedicated sound for the controller 4 may be outputted. The microphone collects sound in the surrounding of the controller 4 such as utterance sound of the player or the like, and then transmits the sound data to the game machine 1.

FIG. 2 shows a block diagram illustrating the hardware configuration of the game machine 1 according to Embodiment 1. The game machine 1 includes a processing part 10, an output part 11, a recording medium attachment part 12, a primary storage part 13, a secondary storage part 14, a short-distance wireless communication part 15, and a wireless communication part 16.

The processing part 10 of the game machine 1 is constructed from an arithmetic processing unit such as a CPU (Central Processing Unit). The processing part 10 reads a management program, an emulation program, and a game program stored in the secondary storage part 14, then loads the programs onto the primary storage part 13, and then executes the programs so as to perform game processing. All or a part of the management program P1, the emulation program P2, and the game program P3 may be read from the recording medium 2 attached to the recording medium attachment part 12.

The output part 11 outputs the image and the sound provided from the processing part 10 so that the image is displayed on the display 3 and the sound is outputted through the speaker built in the display 3. The recording medium attachment part 12 is constructed such that the recording medium 2 such as a DVD (Digital Versatile Disc) and a CD-ROM (Compact Disc Read Only Memory) is allowed to be attached thereto and detached therefrom. Here, the recording medium attachment part 12 may be constructed such that a cassette used in conventional game machines is allowed to be attached. Then, the game program P3 and the like may be read from the cassette. The primary storage part 13 is constructed from a semiconductor memory device or the like. The primary storage part 13 temporarily stores various kinds of data generated in association with the arithmetic processing of the processing part 10. The secondary storage part 14 is constructed from a nonvolatile storage device having a larger capacity than the primary storage part 13. The secondary storage part 14 stores the game program and other data or the like.

The short-distance wireless communication part 15 performs communication with the controller 4. That is, the short-distance wireless communication part 15 receives from the controller 4 the operation input and the sound data collected through the microphone, and then outputs these kinds of data to the processing part 10. Further, the short-distance wireless communication part 15 transmits to the controller 4 the image or the sound inputted from the processing part 10 or the output part 11.

The wireless communication part 16 transmits and receives information to and from a server apparatus or the like through a network such as a wireless LAN (Local Area Network) or a portable telephone network. For example, the game machine 1 performs communication with the server apparatus through the wireless communication part 16 so as to download the game program P3 and then stores the program into the secondary storage part 14. Similarly, the management program P1, the emulation program P2, and the like may be downloaded from the server apparatus.

Figure 3:
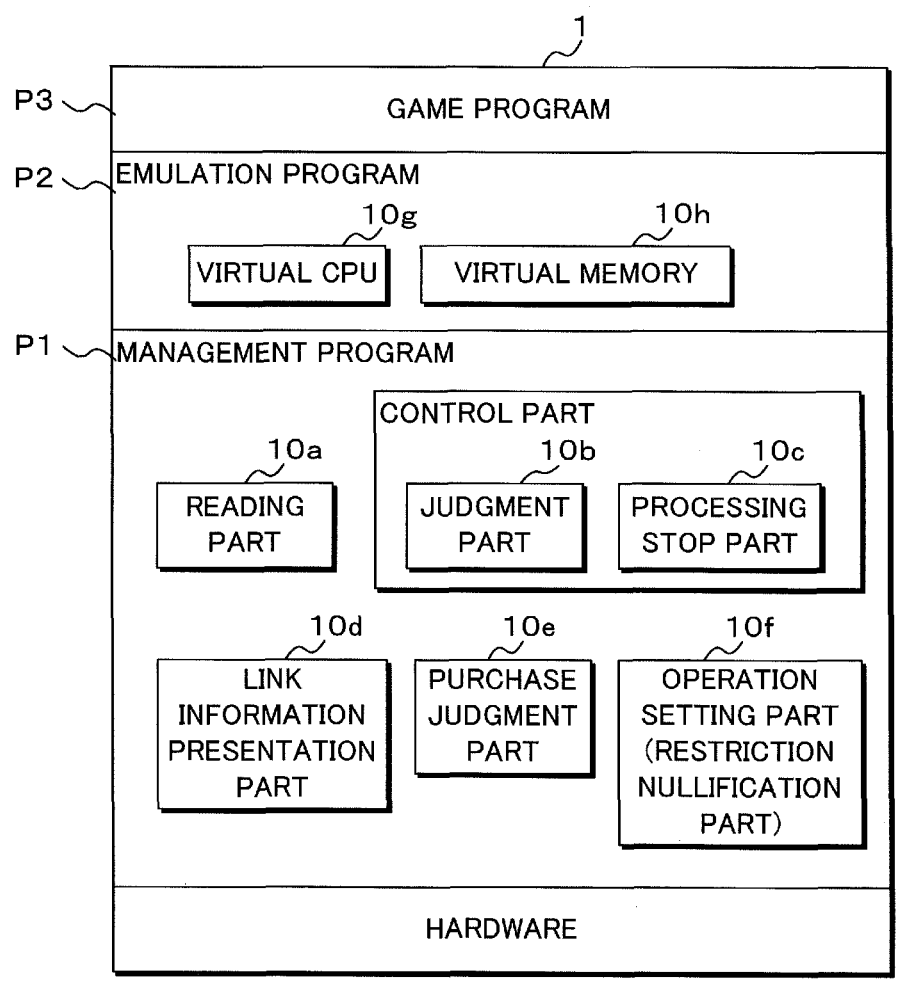
FIG. 3 shows an explanation diagram illustrating relation between hardware and software of a game machine according to Embodiment 1.

FIG. 3 shows an explanation diagram illustrating the relation between the hardware and the software of the game machine 1 according to Embodiment 1. The management program P1 is executed on the hardware of the game machine 1. An emulator (an emulation part) implemented by the emulation program P2 operates on the management program P1. Further, the game program P3 operates on the emulator.

The emulator (the emulation part) emulates the hardware of any other game machine having a different hardware configuration from the game machine 1. The emulator includes a virtual CPU 10g and a virtual memory 10h. The emulator permits operation of a game program whose operation is intrinsically allowed only in other game machines. For example, the term "other game machines" indicates game machines of a former generation.

The management program P1 includes as functional parts a reading part 10a, a judgment part 10b, a processing stop part 10c, a link information presentation part 10d, a purchase judgment part 10e, and an operation setting part (a restriction nullification part) 10f. The reading part 10a reads execution situation information necessary for the operation of the emulator. Here, the execution situation information indicates register information, memory information, and the like in a situation where the game program execution has been stopped at a given position before the end of the game program.

The judgment part 10b monitors the execution status of the game program executing on the emulator and thereby judges (e.g., determines) whether the execution status satisfies a condition (referred to as a clearing condition, hereinafter) set forth in advance. The clearing condition is such that, when it is satisfied, the emulation is stopped. In the present embodiment, the judgment part 10b performs judgment on the basis of the displayed contents of the current game image displayed on the display 3. Matching between the current game image and the judgment-use image specified in the clearing condition is performed so that on the basis of the result, it is judged whether the clearing condition is satisfied.

When the judgment part 10b has detected that the execution status satisfies the condition set forth in advance, the processing stop part 10c changes the execution status of the game program under execution on the emulator. For example, execution of the game program under execution is stopped and then execution is restarted at an execution position set forth in advance. Alternatively, another game program is read and then the program is executed with starting at a given execution position.

The link information presentation part 10d links link information to a web page used for accepting a purchase request for a game contained in the game mix, to an icon image or the like and then adds the icon image to the output image of the game machine 1. An example of the link information is an URL (Uniform Resource Locator) serving as location information for a web page on the Internet.

The purchase judgment part 10e judges whether the game program whose execution is instructed has been purchased. The operation setting part 10f sets up the operation of the reading part 10a, the judgment part 10b, and the processing stop part 10c. This is because the operation of the reading part 10a, the judgment part 10b, and the processing stop part 10c is different between a case that a part of a game program is executed as the game mix (a partial execution mode) and a case that the entirety of a purchased game program is to be executed (an entirety execution mode). Such execution modes are described later.

In the game machine 1, when the processing part 10 executes the management program P1, the reading part 10a, the judgment part 10b, the processing stop part 10c, the link information presentation part 10d, the purchase judgment part 10e, and the operation setting part 10f are implemented as software-based functional means.

Figure 4:
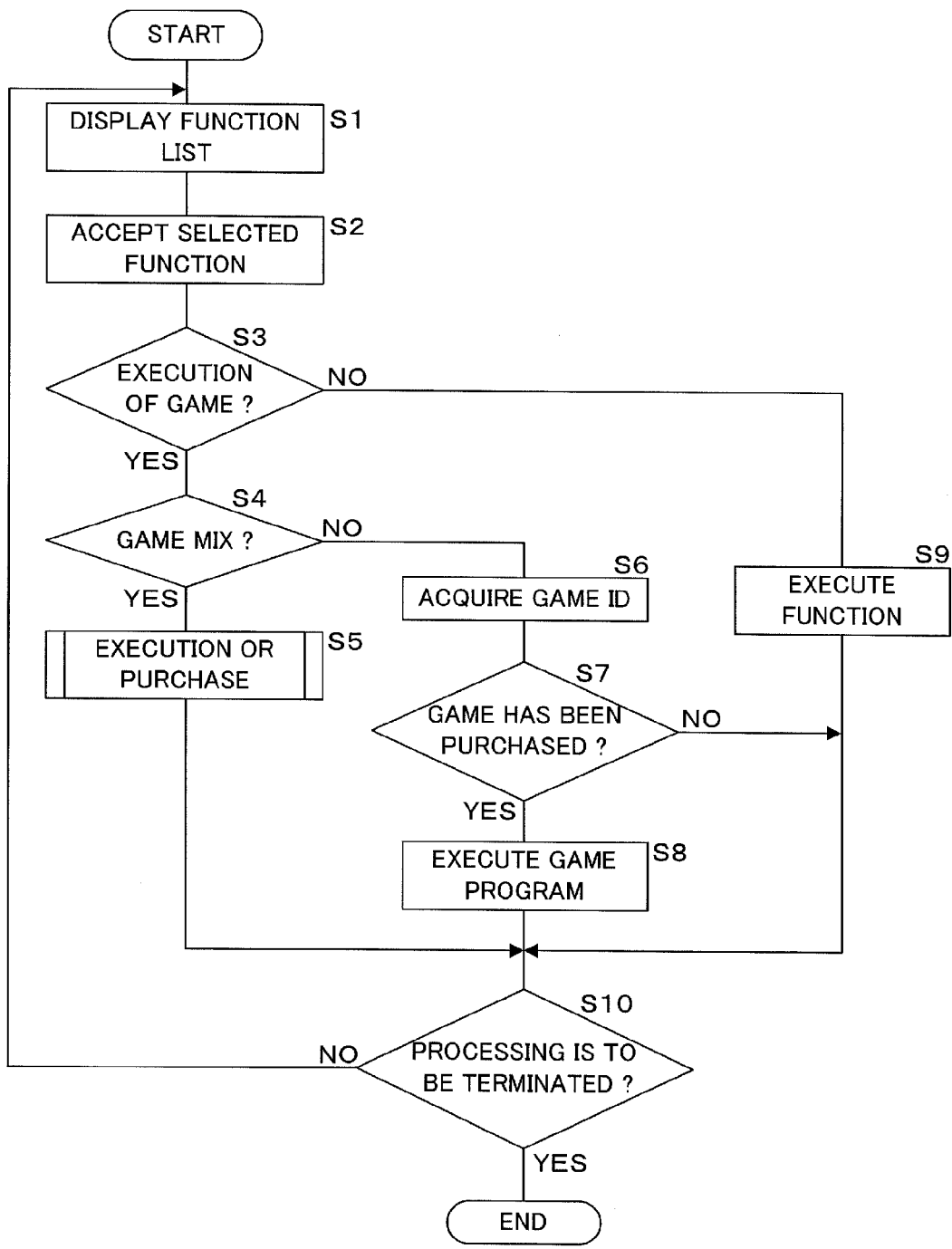
FIG. 4 shows a flow chart illustrating outlines of processing performed by a game machine.

FIG. 4 shows a flow chart illustrating the outlines of the processing performed by the game machine 1. The game machine 1 displays a function list (step S1). The functions mentioned here include game execution, access to an SNS (Social Networking Service), watching and listening of a video by Internet distribution, and setting to the game machine 1. The game machine 1 accepts a function selected by the player (step S2). The game machine 1 judges whether the accepted function is execution of a game (step S3). When the function is execution of a game (YES at step S3), the game machine 1 judges whether the function is for the game mix (step S4). When the function is for the game mix (YES at step S4), the game machine 1 performs the execution processing and the purchase processing of the game in the game mix function (step S5). The game machine 1 judges whether the processing is to be terminated (step S10). When the processing is to be terminated (YES at step S10), the game machine 1 terminates the processing. When the processing is not to be terminated (NO at step S10), the game machine 1 returns the processing to step S1.

When execution of a game not contained in the game mix is instructed (NO at step S4), the game machine 1 acquires a game ID from the instruction information (step S6). The game machine 1 judges whether the game has been purchased (step S7). When the game has been purchased (YES at step S7), the game machine 1 reads and executes the game program (step S8) and then moves the processing to step S10. When the game has not been purchased (NO at step S7), the game machine 1 moves the processing to step S10. When the specified execution function is not game execution (NO at step S3), the game machine 1 executes the specified function (step S9) and then moves the processing to step S10. The processing at step S10 is as described above.

Here, when the game has not been purchased (NO at step S7), the processing has been moved to step S10. Instead, the screen may be transited to one used for accepting a purchase request for a game.

Here, execution modes are described below. As described above, the game machine 1 has two execution modes consisting of a partial execution mode in which a part of a game program is executed and an entirety execution mode in which the entirety of a game program is executed. In the partial execution mode, by using the execution situation information, the game program is executed with starting at a given position. For the purpose of allowing such operation, the execution situation information contains the register information, the memory information, and the like in a situation that the game program has been stopped at a given position. Further, when the clearing condition has been satisfied, execution is stopped. At step S5 in FIG. 4, the game machine 1 operates in the partial execution mode. In the partial execution mode, the judgment part 10b and the processing stop part 10c operate. The reading part 10a reads a game program to which execution situation information and a clearing condition are added. The emulator emulates the game program by using the execution situation information. That is, in the game mix function, play of each game is started in the middle of the scene. Then, the play is terminated at the time that the clearing condition is satisfied.

At step S8 in FIG. 4, the game machine 1 operates in the entirety execution mode. In the entirety execution mode, the judgment part 10b and the processing stop part 10c do not operate. Further, the reading part 10a reads a game program to which execution situation information and a clearing condition are not added. The emulator emulates the game program in a normal manner with starting at the beginning. That is, a purchased game is allowed to be played with starting at the beginning of the game.

Here, the execution situation information may be used also in the entirety execution mode. The execution situation information is utilized as so-called save data used in order that scenes already cleared by the player should be skipped so that the game should be started at a scene not yet cleared.

Figure 5A:
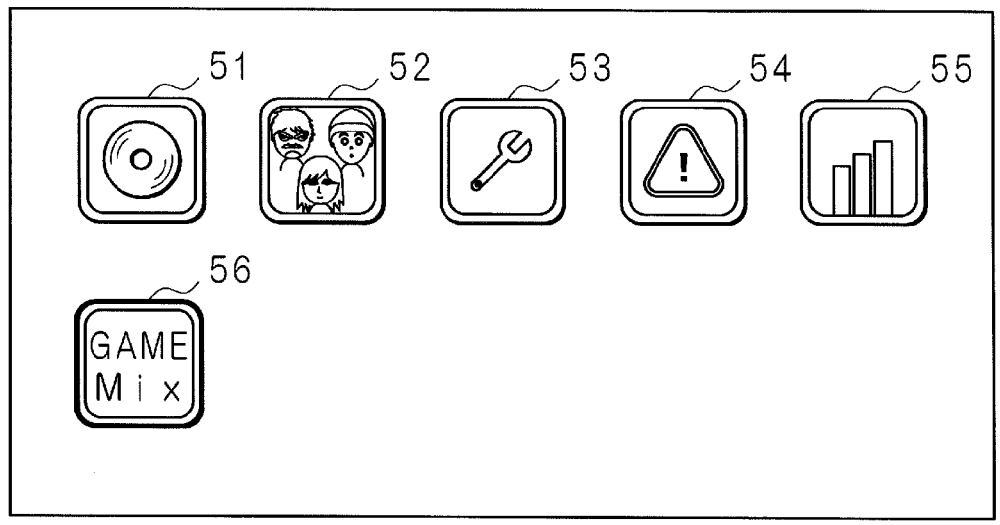
FIGS. 5A and 5B show explanation diagrams each illustrating an example of screen display of a game machine according to Embodiment 1.
Figure 5B:
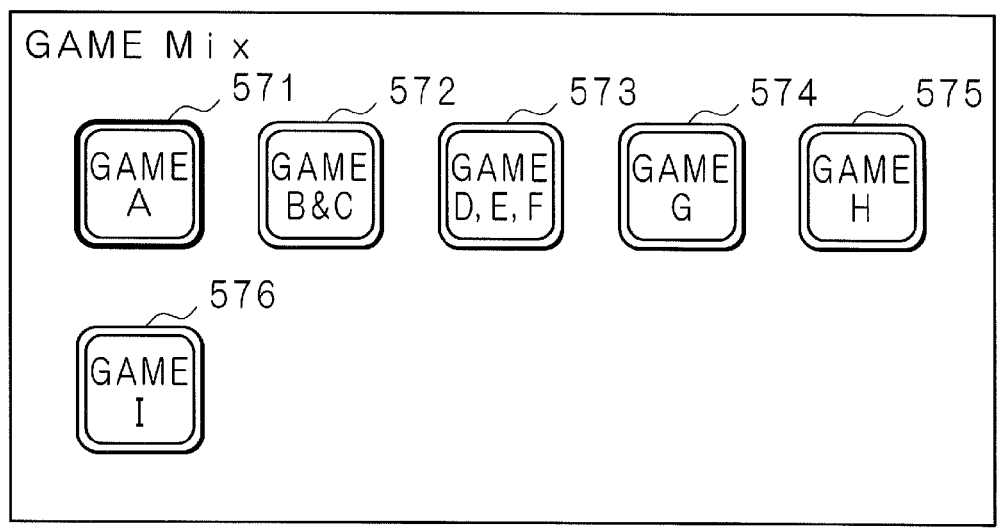

Next, the procedure of game program purchase in Embodiment 1 is described below. FIGS. 5A and 5B show explanation diagrams each illustrating an example of screen display of the game machine 1 according to Embodiment 1. FIG. 5A illustrates a menu screen in which functions allowed to be executed are displayed in the form of icons. An icon 51 is an icon linked to the recording medium attachment part 12. The example illustrated in FIG. 5A indicates a situation that the recording medium 2 is not attached to the recording medium attachment part 12. When the recording medium 2 in which a game program is stored is attached to the recording medium attachment part 12, an icon for a game program is displayed at the position of the icon 51.

An icon 52 is an icon used for accessing an SNS. An icon 53 is an icon used for executing the set-up function. An icon 54 is an icon used for executing the function of displaying remarks. An icon 55 is an icon used for executing the function of displaying the usage history. An icon 56 is an icon used for executing the game mix function.

FIG. 5B illustrates a screen displayed over the preceding screen when the player has selected the icon 56 for the game mix and then inputted its execution. Game icons 571 to 576 are displayed and aligned. The icon 571 is an icon used for executing a game A. When the game A is selected, partial execution of a plurality of scenes of the game A is performed. This allows the player to try and check what kind of game the game A is. The icon 574, the icon 575, and the icon 576 are similar to this.

When the icon 572 is selected, two games consisting of a game B and a game C are allowed to be played. Partial execution of a plurality of scenes of the game B and the game C is performed. The order of execution is allowed to be set up in advance. Partial execution of one scene may be performed alternately for the game B and the game C. Alternatively, partial execution of a plurality of scenes of the game B may be performed and then partial execution of a plurality of scenes of the game C may be performed. The icon 573 indicates that three games are allowed to be played.

Figure 6:
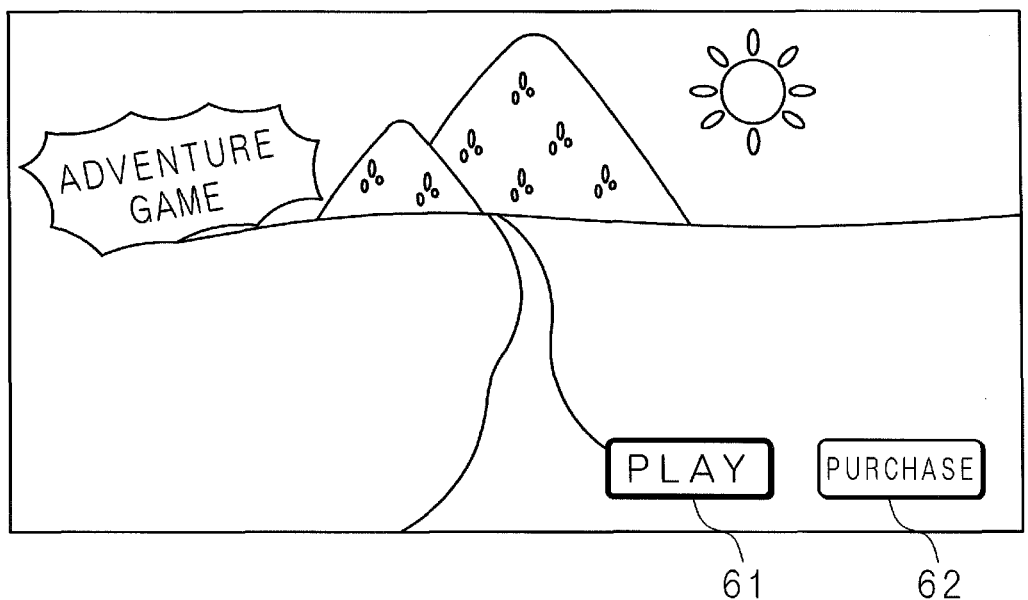
FIG. 6 shows an explanation diagram illustrating an example of a top screen of a game.

FIG. 6 shows an explanation diagram illustrating an example of a top screen of a game. The top screen displays a "play" button 61 used for starting the game and a "purchase" button 62 used for purchasing the game program.

When the player selects the "play" button 61 so as to instruct execution, execution of the game begins. The "purchase" button 62 is linked to link information, such as a URL, of a page used for purchasing the game program selected in FIGS. 5A and 5B. When the "purchase" button 62 is selected, the screen transits into a page used for purchasing the game program. That is, execution of the game program is stopped and then another program such as a browser program is started.

Figure 7:
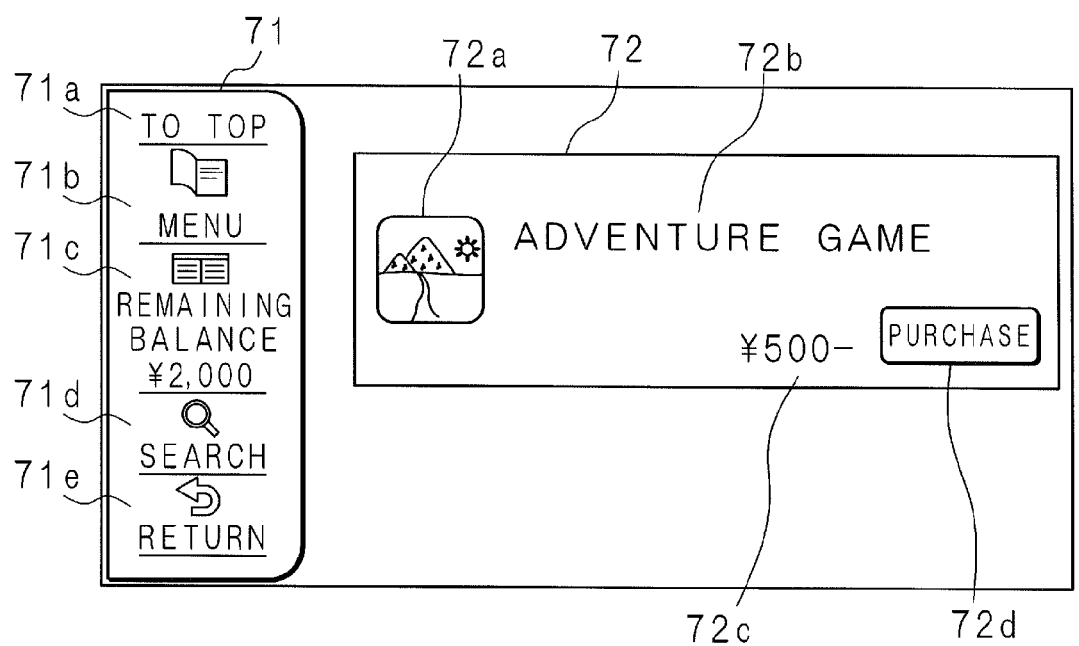
FIG. 7 shows an explanation diagram illustrating an example of a web page screen used for purchasing a game program.

FIG. 7 shows an explanation diagram illustrating an example of a web page screen used for purchasing a game program. The web page screen includes a menu area 71 displayed in the left part of the screen and a purchase area 72 extending from the vicinity of the right end part of the menu area 71 to the right end part of the screen. The screen illustrated in FIG. 7 is a web page of an online shop from which a game program is allowed to be purchased and downloaded. The menu area 71 displays an icon used for transition to another menu. A top-transition icon 71a is an icon used for transition to the top screen of the online shop. A menu icon 71b is an icon used for transition to a menu list screen of the online shop. A remaining-balance icon 71c is an icon used for transition to an operation screen in which addition of electronic money acceptable in the online shop or other operation is performed. The remaining balance of electronic money of the player is displayed together with the icon. A search icon 71d is an icon used for transition to a search screen in which purchasable game programs are searched. A return icon 71e is an icon used for transition to the preceding screen. In this example, as described above, the browser program has been started from the game top screen and then the screen has transited directly to the screen illustrated in FIG. 7. Thus, such a preceding screen is not defined. Thus, when the return icon 71e is selected and operated, the browser program is terminated and then the screen returns to the game top screen illustrated in FIG. 6.

The purchase area 72 displays an icon 72a indicating the game program illustrated in FIG. 6, a game name 72b, and a selling price 72c, and a "purchase" button 72d. When the player selects and operates the "purchase" button 72d, payment is processed so that the game program is purchased. The payment processing is of publicly known technique and hence its description is omitted.

Figure 8:
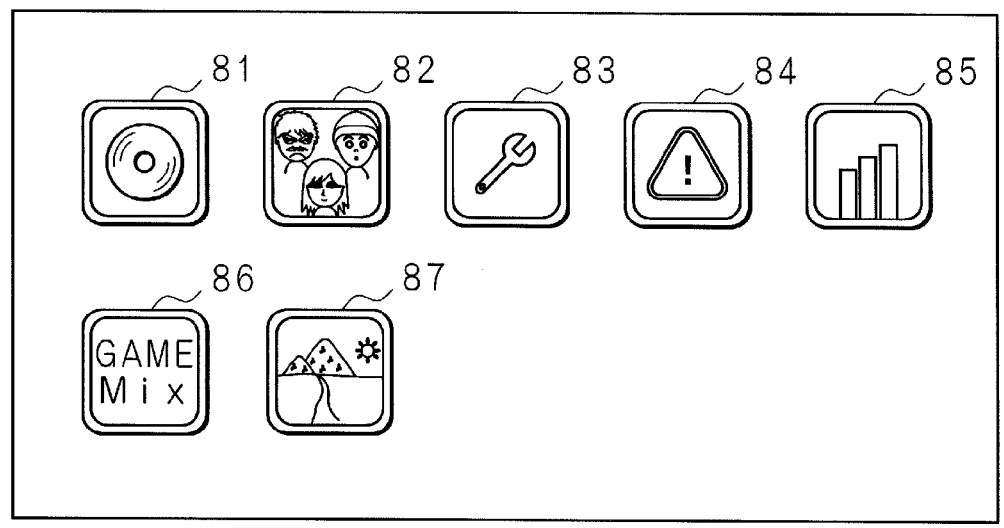
FIG. 8 shows an explanation diagram illustrating an example of a menu screen posterior to purchase of a game program.

FIG. 8 shows an explanation diagram illustrating an example of a menu screen posterior to the purchase of a game program. Displayed icons 81 to 86 are the same as those illustrated in FIG. 5A. However, an icon 87 for the purchased game is displayed in addition.

Figure 9:
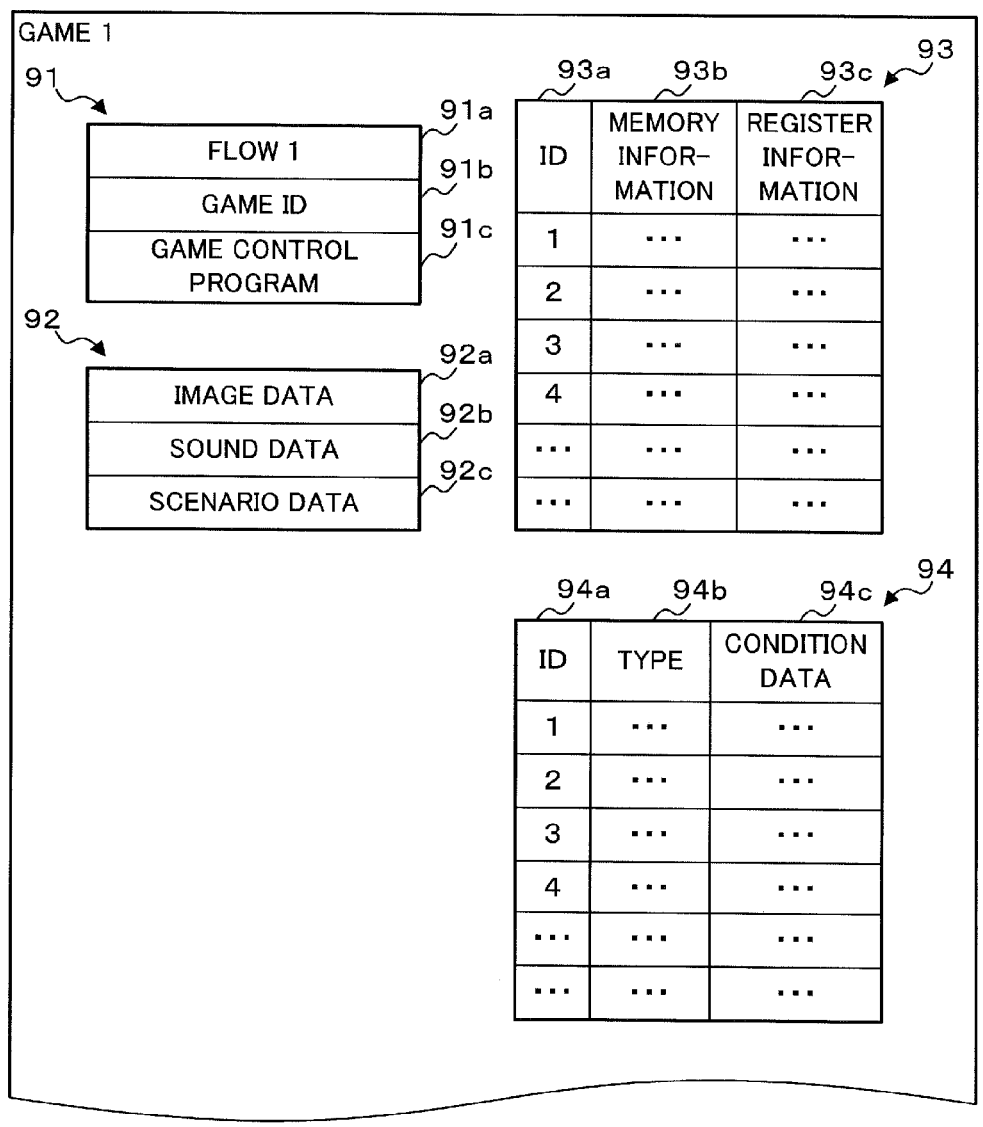
FIG. 9 shows an explanation diagram illustrating a conceptual structure of a game program.

Next, a game program for the game mix employed in the present embodiment is described below. FIG. 9 shows an explanation diagram illustrating the conceptual structure of the game program. The game program includes a program part 91, a data part 92, an execution situation part 93, and a clearing condition part 94. The program part 91 includes a flow 91a, a game ID 91b, and a game control program 91c. The game ID 91b is an ID used for identifying the game program. The game title is the name of the game provided by the game program. The game control program 91c is the main body of the program. The data part 92 includes image data 92a, sound data 92b, and scenario data 92c. The image data 92a is various kinds of image data used for constructing the game screen. The sound data 92b is various kinds of sound data outputted at the time of game execution. The scenario data 92c is data concerning the progress of the game such as the story.

The execution situation part 93 and the clearing condition part 94 are data prepared for the game mix function. The execution situation part 93 is a region storing the execution situation information.

The execution situation information is information used for starting the execution of the game program at a given position. The execution situation part 93 includes an ID 93a, memory information 93b, and register information 93c. The ID 93a is used for identifying each execution situation. The memory information 93b and the register information 93c are information respectively concerning the contents of the memory and the values of the various registers at a given position in the course of game program execution. When the register information and the memory information are used, the state at the given position is allowed to be reproduced and then the game program is allowed to be executed with starting at the given position in place of the beginning of the program. The execution situation information may contain information such as a stack, a flag register, an interrupt vector, and the timer value of an interval timer or the like.

The execution situation information indicates the register information, the memory information, and the like in a situation that the game program has been stopped at a given position. That is, the execution situation information is static information also referred to as a so-called snapshot.

In contrast, the execution status indicates the state during the operation of the game program and hence is dynamic information premised to vary continuously. When plural pieces of the execution situation information are aligned in time series, the newest one is the execution status.

The clearing condition part 94 includes an ID 94a, a type 94b, and condition data 94c. The ID 94a is used for identifying the clearing condition. The type 94b indicates the type of the condition. The condition data 94c is data necessary for definition of the clearing condition.

Figure 10A:
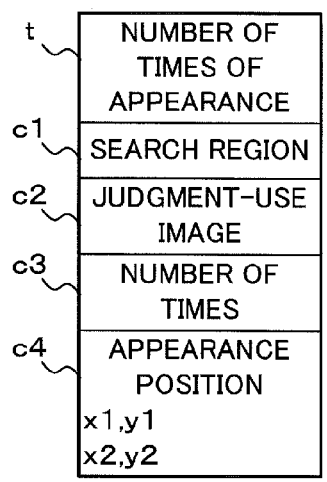
FIGS. 10A to 10C show explanation diagrams each illustrating a data structure of a clearing condition of each condition type.
Figure 10B:
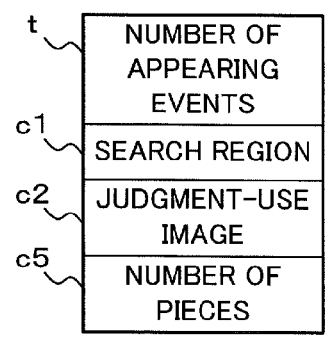
Figure 10C:
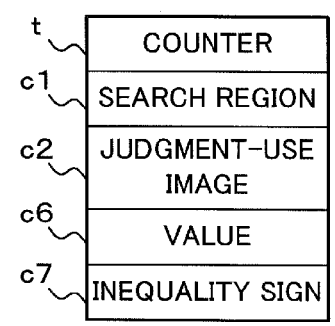

The clearing condition defines a condition for stopping the game program. The flowing description is given for a case that condition judgment is performed in a situation that the image (referred to as a "game image", hereinafter) outputted and displayed by the game program is adopted as an example of the clearing condition. FIGS. 10A to 10C show explanation diagrams each illustrating the data structure of the clearing condition of each condition type. FIGS. 10A to 10C illustrate three condition types. FIG. 10A illustrates the clearing condition for the case of "number of times of appearance" type. In this condition, it is judged that the condition is satisfied when a given image has appeared in the game image in plural times. In this case, the clearing condition contains a search region $c1$, a judgment-use image $c2$, the number of times $c3$, and an appearance position $c4$. The search region $c1$ defines a region to be adopted as a processing target in the game image. The judgment-use image $c2$ is an image used for extracting an image used for judging the clearing condition. The number of times $c3$ is the number of times of appearance for satisfying the clearing condition. The appearance position $c4$ defines a position where a given image is to appear. The number of times of appearance is counted when the given image is displayed within a fixed region relative to the defined position. In a case that any position within the search region is allowed, the appearance position may be not defined. Further, in a case that positions in a number corresponding to the number of times are defined, the condition may be defined as including a case that plural times of appearance occur at mutually different positions.

FIG. 10B illustrates the clearing condition for the case of "number of appearing events" type. In this condition, it is judged that the condition is satisfied when a plurality of given images simultaneously appear in the game image. In this case, the clearing condition contains a search region $c1$, a judgment-use image $c2$, and the number of pieces $c5$. The search region $c1$ and the judgment-use image $c2$ are similar to the above-mentioned ones. The number of pieces $c5$ is the number of given images that satisfy the clearing condition.

FIG. 10C illustrates the clearing condition for the case of "counter" type. In this condition, a numerical value that appears in the game image is extracted and then it is judged whether the condition relation is satisfied depending on the magnitude relation of the value relative to a threshold. In this case, the clearing condition contains a search region $c1$, a judgment-use image $c2$, a value $c6$, and an inequality sign $c7$. The search region $c1$ is similar to the above-mentioned one. The judgment-use image $c2$ is also similar to the above-mentioned one. However, since an image representing a numeric character need be extracted, at least nine images representing 0 to 9 are set forth. The value $c6$ is the threshold serving as the reference of condition judgment. The inequality sign $c7$ indicates the relation between the numerical value on the screen and the threshold when the condition is to be satisfied. In a case that the inequality sign $c7$ is a greater-than symbol ">", it is judged that the condition is satisfied when the numerical value on the screen is greater than the threshold.

Next, a detailed example of the clearing condition is described below. A condition is defined that clearing is concluded when the player character has eluded the enemy character. Here, the enemy character is premised to appear from the right side of the screen and then move to the left on the screen. When the player character has eluded the enemy character, the enemy character moves to the left side of the screen and then disappears.

In this case, in a case that the enemy character appears from the right side of the screen, then moves to the left side of the screen, and then becomes no longer displayed, it is allowed to judge that the player character has eluded the enemy character. Thus, for example, the clearing condition is set up as follows.

Type: number of times of appearance
Search region: entire screen
Judgment-use image: enemy character image
Number of times: 2
Appearance position: x=value at right end and y=arbitrary at first time; x=value at left end and y=arbitrary at second time Here, the employed coordinate system is such that the upper left corner of the screen is adopted as the origin, the rightward direction from the origin is adopted as the x-axis, and the downward direction form the origin is adopted as the y-axis. This definition is employed also in the following description.

Here, a width is not set forth for the coordinates of the appearance position. However, a width may be set forth when the position is judged. The y-coordinate has been "arbitrary". However, in a case that the corresponding enemy character does not move up and down, the y-coordinate may be specified.

Further, for the purpose of more accurately detecting the motion of the enemy character, the number of times of appearance may be increased.

When a condition similar to the above-mentioned one is set up, detection is allowed for a situation that the player character having started at the start has reached the goal and a situation that the player character having started at the start has fulfilled any task and then returned to the start.

In a racing game, at the time that the player character has crossed the goal line, when a message "GOAL!" displayed at that time is detected, it is allowed to detect the situation that the player character has crossed the goal line. In a case that shortcut of the course is allowed, when a background image at a point where shortcut is allowed and a background image at a point where shortcut has been succeeded are used, a situation that shortcut has been succeeded is allowed to be detected. Further, it is allowed to detect a message image such as "Clear!" in a case that the scene has been cleared and a message such as "Win!" in a case that the opponent character has been defeated in a fighting game.

Further, in a case that a special pose taken by the player character is detected, it is allowed to detect a situation of having crossed the goal line or having defeated the enemy character.

Further, in a case that an effect image displayed when the enemy character has been defeated is detected, it is allowed to detect a situation that the player character has defeated the enemy character.

Next, a case that the clearing condition is such that a predetermined number of walls are destroyed is premised. In this case, it is sufficient to acquire an image displayed immediately after destruction of a wall. In a case that clearing is concluded when the player character has destroyed a predetermined number of walls, for example, the clearing condition is set up as follows.

Type: number of times of appearance
Search region: entire image
Judgment-use image: image immediately after destruction of wall
Number of times: predetermined number
Appearance position: arbitrary When a condition similar to the above-mentioned one is set up, a condition that clearing is concluded when a predetermined number of enemy characters have been defeated is also allowed to be set up.

Then, a case that a change in the player stock number of the player characters is detected is premised. In many games, the player stock number is indicated by the number of displayed icons or by a numeric character. In the case of icon display, a situation that three particular icons are displayed indicates that the player stock number is 3. Here, in a case that clearing is concluded when the player stock number is increased by one so that the player stock number becomes 4, for example, the clearing condition is set up as follows.

Type: number of appearing events
Search region: given region (display area for player stock number)
Judgment-use image: icon image indicating player stock
Number of pieces: number of pieces at which clearing is concluded (4 in this example)

Here, in the above-mentioned example, the player stock number necessary for clearing has been 4. However, when the player stock number at beginning is indefinite, it is sufficient that the player stock number is acquired at beginning and then increment by one in the player stock number is detected. In such a case, it is sufficient that setting of the number of pieces is expressed by "+1" or the like with sign so that distinction from the above-mentioned case is achieved. Also a case that clearing is concluded when the player character has acquired an item may be treated similarly to the above-mentioned case.

Next, a case that clearing is concluded when a score reaches a given value is premised. For example, a condition that clearing is concluded when the score reaches 150 points is set up as follows.

Type: counter
Search region: given region (display area for score)
Judgment-use image: image indicating numeric character (images from "0" to "9")
Value: value (150) at which clearing is concluded
inequality sign: = or ≥

Here, in a case that a change in the player stock number is detected, when display of the player stock number is performed not by the number of icons, condition setting is achieved by setting similar to the above-mentioned one. Also in a case that the clearing condition is set as that a predetermined number of floors or walls are destroyed, when screen display of the number of destructions is performed by using a numeric character, condition setting is achieved by setting similar to the above-mentioned one.

Here, the judgment-use image has been premised to be an image of any character from "0" to "9". However, in a case that the value for the score, the player stock number, or the number of destructions used for the clearing condition is a fixed value, an image alone that displays the fixed value may be adopted as the judgment-use image. Then, it is sufficient that the condition type is set to be "number of times of appearance" and the number of times is set to be 1.

As described above, the clearing condition of diverse kind is allowed to be set up. Thus, the game is allowed to be cleared in response to the clearing condition different from the original clearing condition of the game program. For example, in a baseball game, clearing may be concluded when merely one out has been made. Alternatively, in a role playing game, clearing may be concluded when an item is acquired so that the obtained point has been increased.

In the present embodiment, the execution situation information is information representing the situation in the middle of the game. For example, in a game containing a plurality of scenes, when the situation of the beginning of a third scene is prepared as the execution situation information, the player is allowed to start the game at the beginning of the third scene as if the player has cleared the first scene and the second scene even if has not actually cleared the first scene and the second scene. Further, when the execution situation information is acquired in the middle of the scene, the game is allowed to be started even at the middle of the scene. For example, in the last scene, when the execution situation information is acquired in a situation that the conditions necessary for appearance of a boss character have been satisfied, the player is allowed to fight with the boss character without the necessity of clearing other scenes.

On the other hand, when the clearing condition is used, operation of the game program is allowed to be stopped at an arbitrary time point. That is, the game is allowed to be cleared on the basis of a condition different from the intrinsic one of the game program.

Here, the clearing condition for judgment of clearing of the game has been adopted as the "stop condition". Instead, a condition for judgment of game over may be included into the "stop condition".

As described above, when the execution situation information and the clearing condition are used, partial execution of a game program is achievable. Further, when partial execution of a game program is performed successively for a plurality of programs, the game mix function is achieved that the player is allowed to enjoy a large number of games in a short time. In the following description, the definition of the order of execution of the game programs, the execution start position in each execution, the condition for stopping, and the like in the game mix is referred to as an execution flow.

Figure 11:
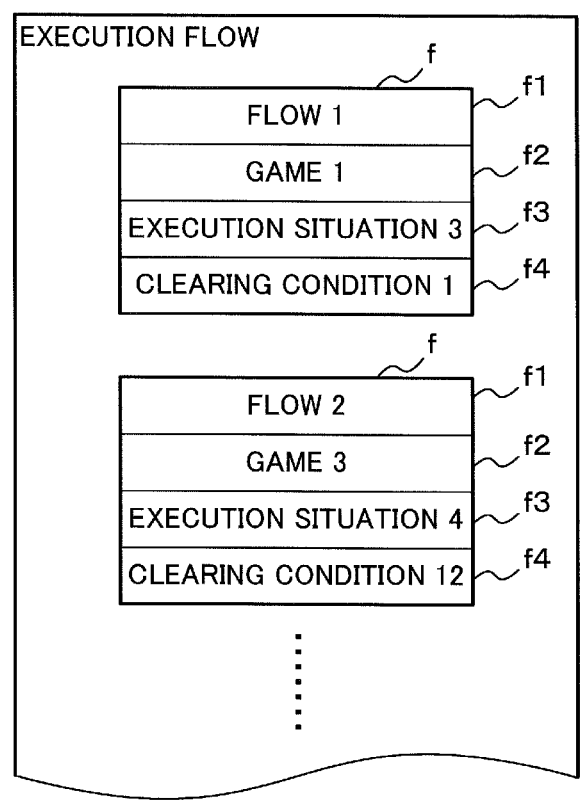
FIG. 11 shows an explanation diagram illustrating a data structure of an execution flow.

FIG. 11 shows an explanation diagram illustrating the data structure of an execution flow. The execution flow is composed of a plurality of flows f. Each flow f is constructed from a flow ID f1, a game ID f2, an execution situation ID f3, and a clearing condition ID f4. The flow ID f1 is used for identifying the flow f. The game ID f2 is the ID of the game to be executed. The execution situation ID f3 is the ID of execution situation information used in the execution of the game. The clearing condition ID f4 is the ID of a clearing condition for judgment of game clearing.

Next, data used in the processing concerning game program purchase is described below. FIG. 12 shows an explanation diagram illustrating the record layout of a link information table of a web page. The web page mentioned here is a page used for accepting a purchase request for a game program, which is similar to that illustrated in FIG. 7. The link information table contains a game ID field 121 and a link information field 122. The game ID field 121 stores the game ID of each game program. The link information field 122 stores the URL of each web page.

FIG. 13 shows an explanation diagram illustrating the record layout of a purchase situation table. The purchase situation table contains a game ID field 131. The game ID field 131 stores the game ID of each game program. The game ID field stores the ID of each purchased game alone. That is, the ID of a not-purchased game is not stored. Thus, on the basis of the presence or absence of a game ID, it is allowed to judge whether the game has been purchased.

Here, in place of the processing that a game ID alone is stored, a flag representing the status of being purchased or not may be stored in a manner of being in correspondence to the game ID. In this configuration, in some cases, judgment of not being purchased is completed without the necessity of referring to all records. Thus, improvement is expected in the search efficiency.

Figure 14:
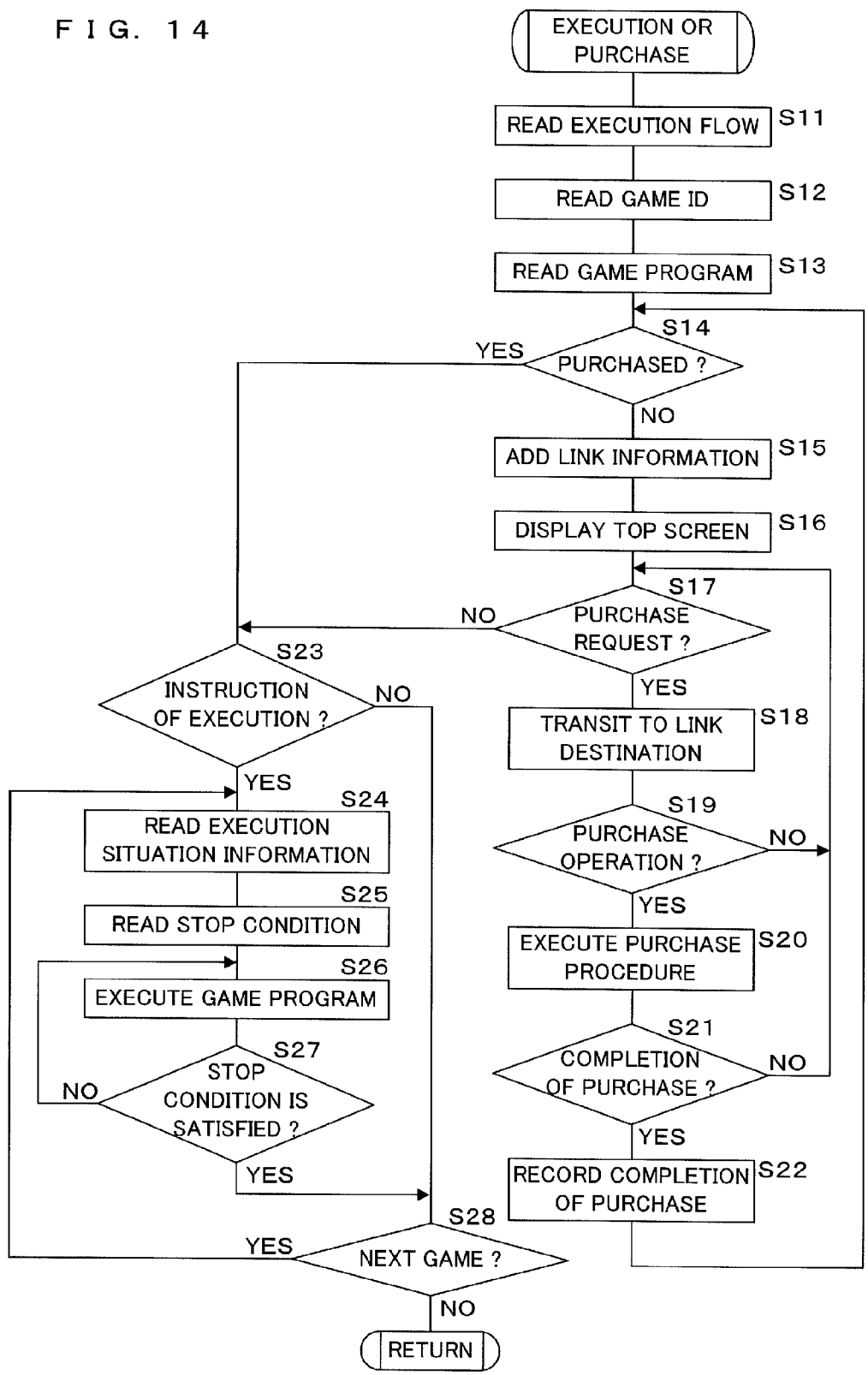
FIG. 14 shows a flow chart of processing executed by a game machine.

FIG. 14 shows a flow chart of the processing executed by the game machine 1. This flow chart describes the details of the execution processing and the purchase processing (step S5) for a game in the game mix function illustrated in FIG. 4. The processing part 10 reads the execution flow (step S11). The processing part 10 reads all game IDs contained in the flow (step S12). The processing part 10 (the reading part) reads the game programs corresponding to all the read-out game IDs (step S13). The processing part 10 (the purchase judgment part) refers to the purchase situation table so as to judge whether each game program has been purchased (step S14). When a game has not been purchased (NO at step S14), the processing part 10 (the information addition part) reads from the link information table the link information corresponding to the game ID and then adds the link information to the output data (step S15). The processing part 10 displays the top screen (e.g., FIG. 6) onto the display 3 (step S16). The processing part 10 judges whether a purchase request has been inputted (step S17). When the player has inputted a purchase request (YES at step S17), on the basis of the link information added at step S15, the processing part 10 transits to the web page (step S18).

The processing part 10 judges whether the player has performed purchase operation (step S19). When purchase operation has not been performed (NO at step S19), the processing part 10 returns the processing to step S17. When purchase operation has been performed (YES at step S19), the processing part 10 executes the processing of purchase procedure in cooperation with a payment processing server (not illustrated) or the like (step S20). The processing part 10 judges whether the purchase has been completed (step S21). When the purchase has not been completed by any reason such as a situation that the remaining balance of electronic money is insufficient (NO at step S21), the processing part 10 returns the processing to step S17. When the purchase has been completed (YES at step S21), the processing part 10 records the completion of purchase into the purchase information table (step S22). Then, the processing part 10 returns the processing to step S14.

When the game program has been purchased (YES at step S14) or alternatively when a purchase request has not been inputted in the top screen (NO at step S17), the processing part 10 moves the processing to step S23. The processing part 10 judges whether game execution has been instructed (step S23). When execution has been instructed (YES at step S23), the processing part 10 (the reading part) reads the execution situation information (step S24). The processing part 10 reads the stop condition (step S25). The processing part 10 (the emulation part) emulates (executes) the game program (step S26). The processing part 10 judges whether the execution status of the game program satisfies the stop condition (the clearing condition) (step S27). When the stop condition has not been satisfied (NO at step S27), the processing part 10 returns the processing to step S26 and then continues execution of the game program. When the stop condition has been satisfied (YES at step S27), the processing part 10 judges whether any flow is to be executed next. That is, the processing part 10 judges whether any game is to be executed next (step S28). In the case of presence of a game to be executed next (YES at step S28), the processing part 10 returns the processing to step S24. In the case of absence of a game to be executed next (NO at step S28), the processing part 10 terminates the processing and then returns the processing to the call source.

Here, it has been premised that at the above-mentioned step S12, all game IDs contained in the execution flow are read and that at step S13, the game programs corresponding to the read-out game IDs are read. However, employable configurations are not limited to this. That is, the game ID of a game alone to be executed at first may be read at step S12 and then the game program alone to be executed at first may be read at step S13. In this configuration, in the case of YES at step S28, the game ID of a game to be executed next may be read (processing similar to step S12), then the game program corresponding to this may be read (processing similar to step S13), and then step S24 may be executed.

When game execution is not instructed and another instruction is inputted (NO at step S23), the processing part 10 does not execute the game program and moves the processing to step S28. The subsequent processing is as described above.

Here, in the above-mentioned processing, the reason why despite that the game program has been purchased, partial execution using the execution situation information and the stop condition has been performed is that the execution has been based on the game mix function. Execution of the purchased game is performed at step S8 in FIG. 4.

As described above, in Embodiment 1, even in the course of enjoying a game by using the game mix function, the corresponding game program is allowed to be purchased. Thus, the player is allowed to purchase the game program contained in the game mix function and then enjoy the entire game.

Embodiment 2

In Embodiment 1, a game program has been allowed to be purchased in the top screen of the game. However, employable configurations are not limited to this. In Embodiment 2, purchase of a game program is allowed when the game has been cleared. Here, the "stop condition" mentioned below is premised to include a condition for judgment of game over in addition to a condition for judgment of game clearing. Then, it is premised that on the basis of a situation which stop condition has been satisfied, the processing part 10 is allowed to judge which of game clearing and game over has been established.

Here, difference from Embodiment 1 is in a part of the processing performed by the game machine 1. Thus, the following description is given mainly for the difference.

Figure 15:
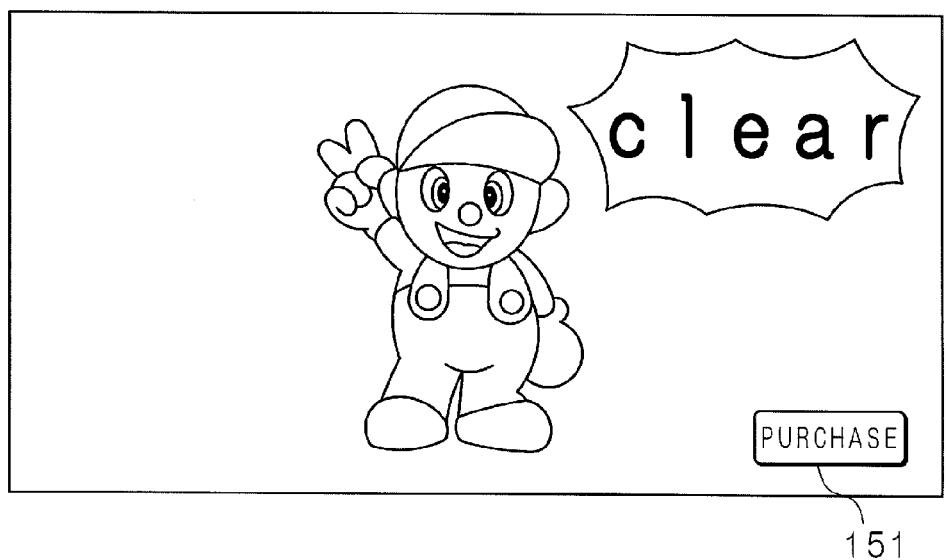
FIG. 15 shows an explanation diagram illustrating an example of a clearing screen.
Figure 16:
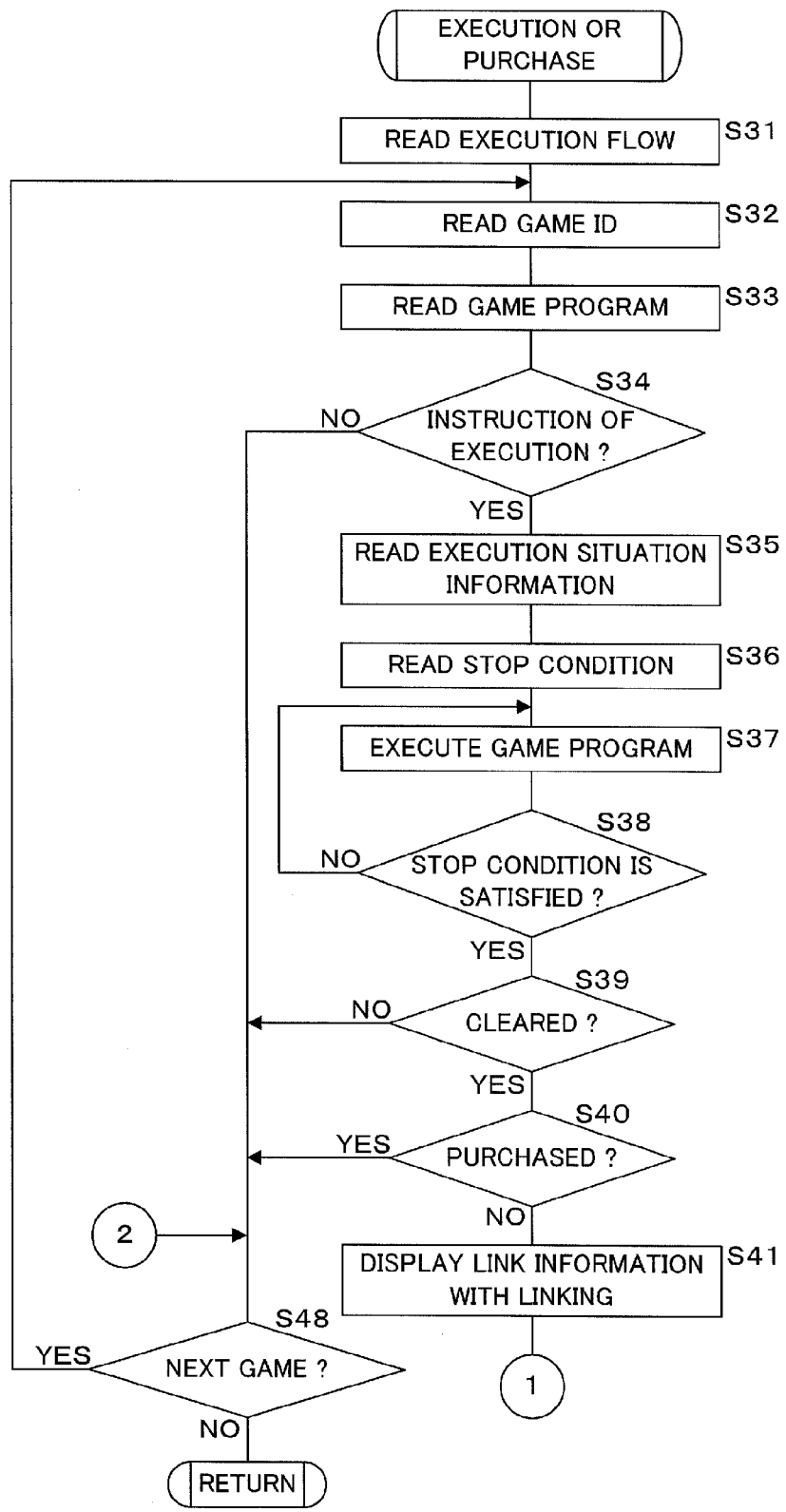
FIG. 16 shows a flow chart of processing executed by a game machine.
Figure 17:
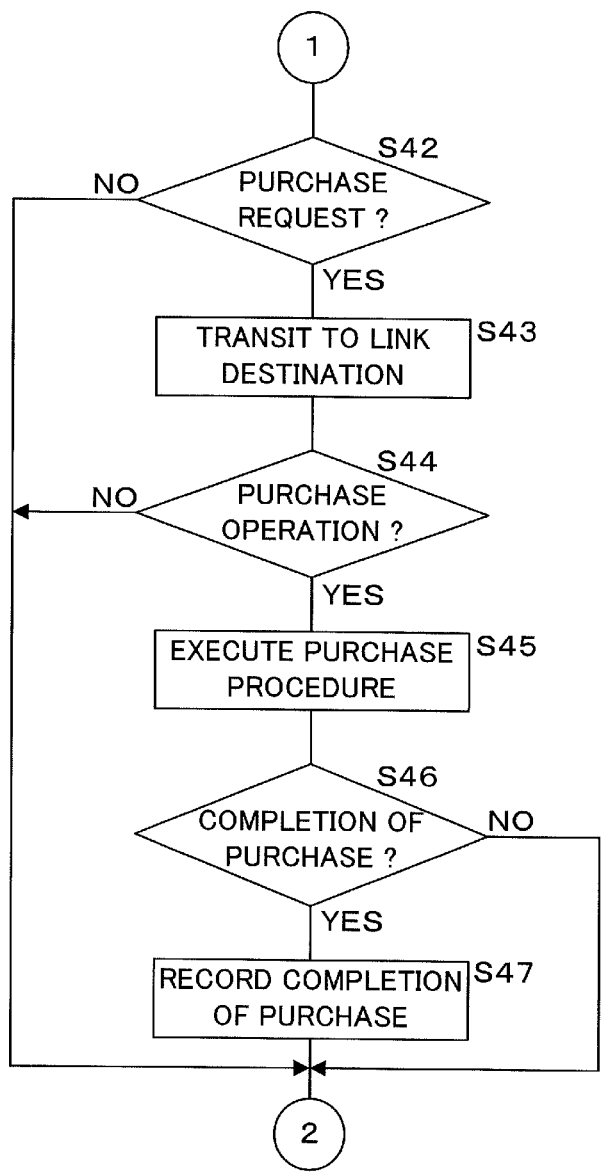
FIG. 17 shows a flow chart of processing executed by a game machine.

FIG. 15 shows an explanation diagram illustrating an example of the clearing screen. A "purchase" button 151 is displayed in the lower right part of the screen. FIGS. 16 and 17 show flow charts of the processing executed by the game machine 1. Steps S31 to S33 are similar to steps S11 to S13 and hence their description is omitted. The processing part 10 judges whether game execution has been instructed (step S34). When execution has been instructed (YES at step S34), the processing part 10 executes steps S35 to S38. The processing at steps S35 to S38 is similar to that at S24 to S27 and hence its description is omitted. The processing part 10 judges whether the game has been cleared (step S39). When the game has been cleared (YES at step S39), the processing part 10 judges whether the game program has been purchased (step S40). When the game has not been purchased (NO at step S40), the processing part 10 displays the output image in a manner of being linked to the link information (step S41). Then, a clearing screen (an example is in FIG. 15) is displayed on the display 3. The procedure goes to FIG. 17 and then the processing part 10 judges whether a purchase request has been inputted (step S42). Steps S42 to S47 are similar to steps S17 to S22 and hence their description is omitted. Returning to FIG. 16, the processing part 10 judges whether any game is to be executed next (step S48). Step S48 is similar to step S28 and hence its description is omitted.

When an instruction other than an execution instruction is inputted at step S34 (NO at step S34), the processing part 10 refers to the execution flow so as to judge whether any game is to be executed next (step S48). In the case of presence of a next game (YES at step S48), the processing part 10 returns the processing to step S32. In the case of absence of a next game (NO at step S48), the processing part 10 terminates the processing and then returns the processing to the call source.

Further, when the game has not been cleared (NO at step S39), or the game program has been purchased (YES at step S40), the processing part 10 moves the processing to step S48.

As described above, in Embodiment 2, transition from the clearing screen to the purchase screen for a game program has been allowed. Thus, the player is allowed to purchase a game immediately after having enjoyed the game. This strongly promotes purchase of the game program by the player.

Embodiment 3

Figure 18A:
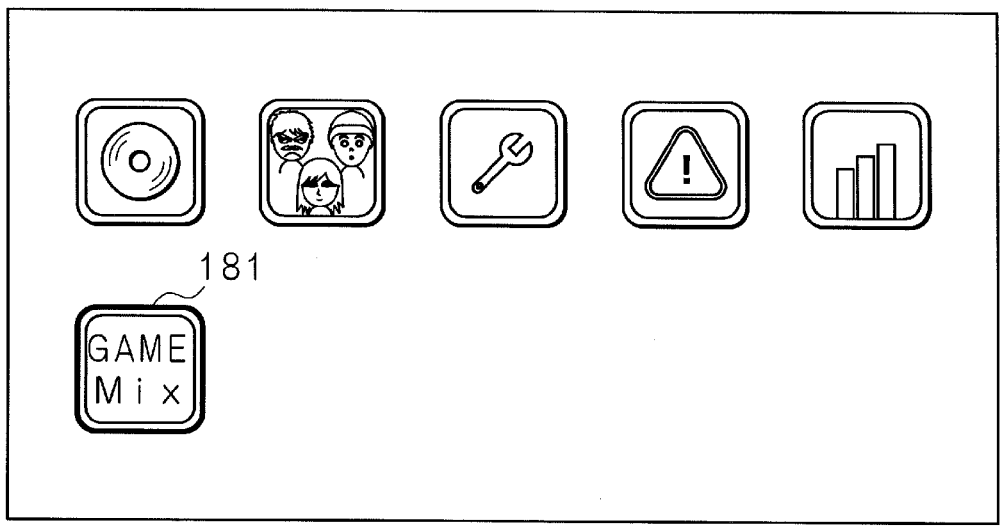
FIGS. 18A and 18B show explanation diagrams each illustrating an example of screen display of a game machine according to Embodiment 3.
Figure 18B:
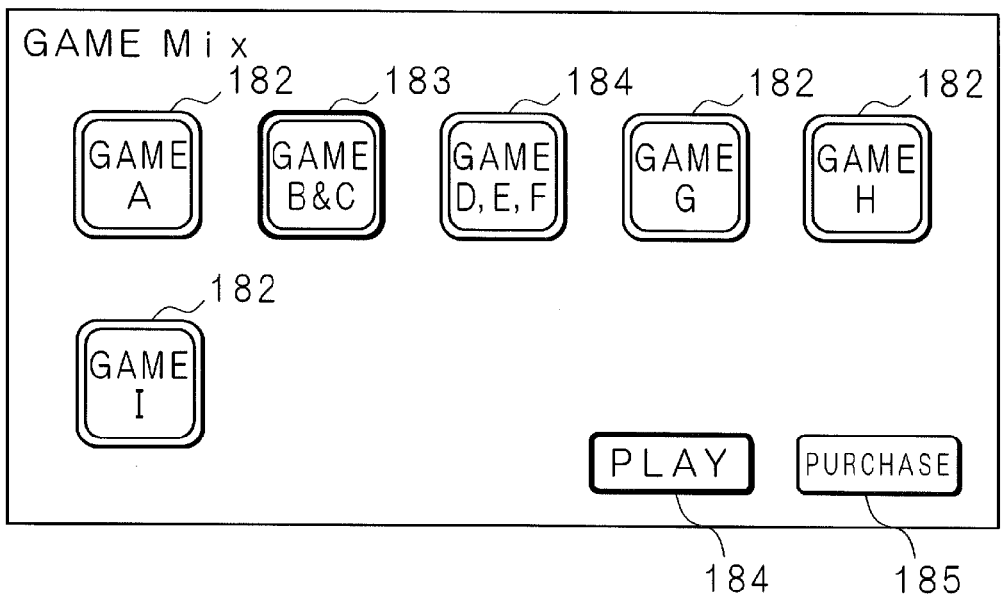

In the above-mentioned Embodiments 1 and 2, purchase of a game has been promoted before and after the playing of the game. In the present embodiment, simultaneous purchase of a plurality of games is promoted. FIGS. 18A, 18B, 19A, and 19B show explanation diagrams each illustrating an example of screen display of a game machine 1 according to Embodiment 3. FIG. 18A illustrates a menu screen similar to that in FIG. 5A. An icon 181 of the game mix is selected. In this state, when the player performs execution operation, the screen illustrated in FIG. 18B is displayed. Icons 182, 183, and 184 for the games allowed to be executed in the game mix function are displayed. The icon 182 is used for allowing a single game to be played. The icons 183 and 184 are used for allowing a plurality of games to be played. In FIG. 18B, the icon 183 for games B&C has been selected. In this state, when the player selects the "play" button 184, the game B and the game C are allowed to be played.

Figure 19A:
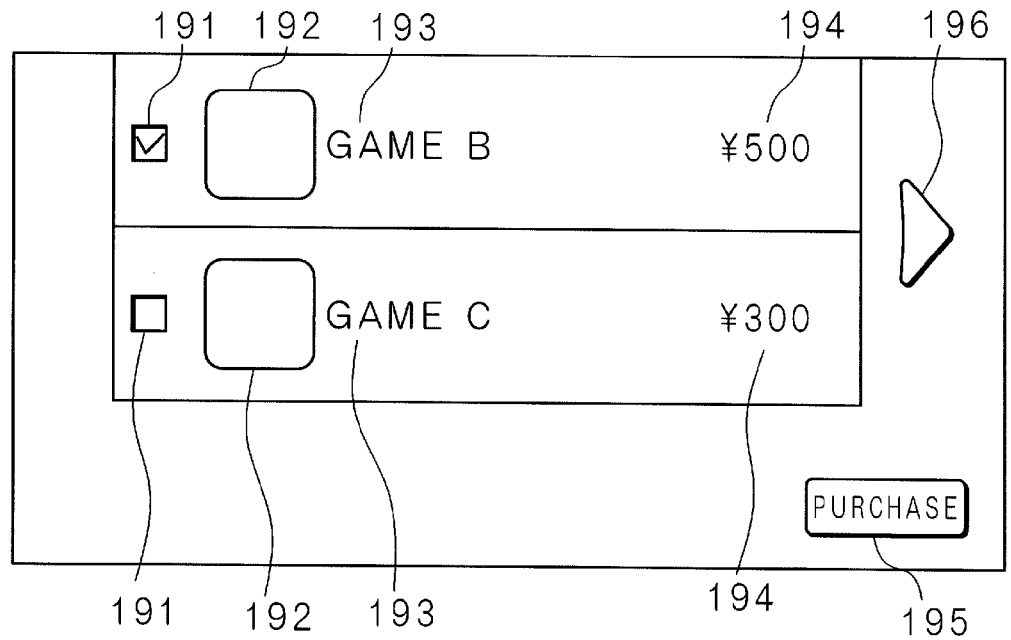
FIGS. 19A and 19B show explanation diagrams each illustrating an example of screen display of a game machine according to Embodiment 3.
Figure 19B:
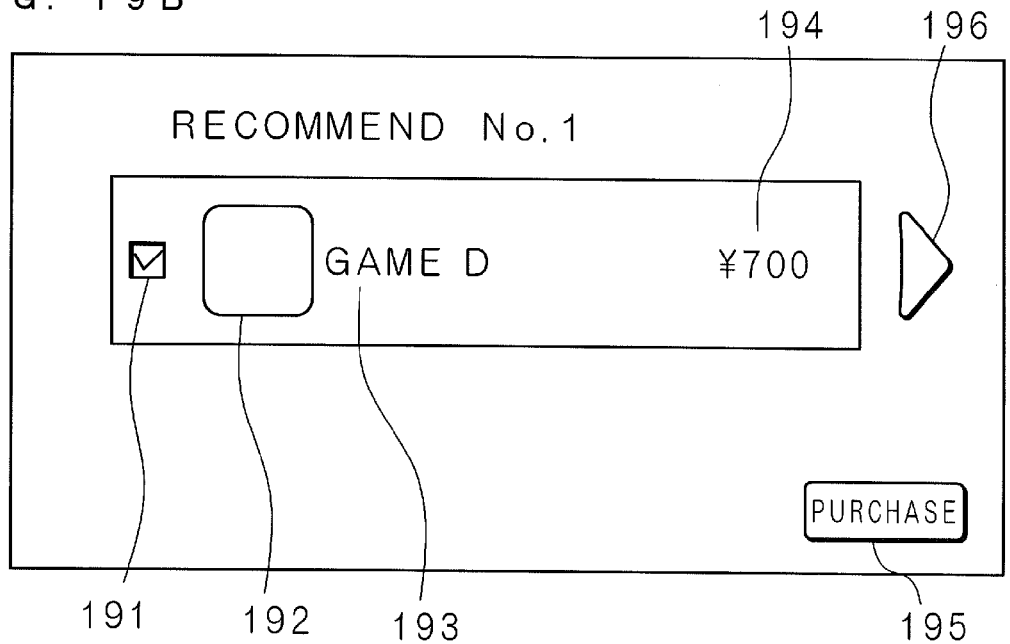

In the screen displayed in FIG. 18B, when the "purchase" button 185 is selected so that execution operation is performed, the screen transits to that displayed in FIG. 19A or 19B. FIG. 19A illustrates an example of the screen in which purchase of a plurality of games is promoted. Since the games-B&C icon 183 has been selected in FIG. 18B, in FIG. 19A, both or any one of the games B and C is allowed to be purchased. FIG. 19B illustrates a screen in which purchase of a recommended game is promoted. In FIG. 19B, a recommended game D is allowed to be purchased. Each check box 191 displayed in FIGS. 19A and 19B is used for selecting a game to be purchased. Each game whose check box 191 is checked serves as a purchase target. An icon 192 indicates the contents of the game. In addition, the game title 193 and the price 194 are displayed. The "purchase" button 195 is used for starting the purchase procedure for the game whose check box 191 is checked. A button 196 is used for movement between pages. When this button is selected and operated, the next page is displayed.

Here, when the icon 182 for a single game is selected in FIG. 18B and then the "purchase" button 185 is selected and executed, a screen in which a single game is allowed to be purchased is displayed similarly in FIG. 19B.

In FIG. 19A, as for the method of presentation of the games, various methods are employable in addition to those described below. (1) All games contained in the game mix function are displayed. (2) All games are displayed at random. (3) Games alone having a past play history are displayed. (4) Games having a past play history are displayed in descending order of the play frequency or the play time. (5) In a case that a plurality of games are contained in one execution flow of the function of the game mix (this corresponds to the icons 183 and 184 in FIG. 18B), each game is displayed.

FIG. 20 shows an explanation diagram illustrating the record layout of a history information table. The history information table includes a game ID field 201, a player ID field 202, a start date and time field 203, and an end date and time field 204. The game ID field 201 stores the ID of a game having been played. The player ID field 202 stores the ID of the player having played the game. The start date and time field 203 and the end date and time field 204 respectively store the start date and time and the end date and time of the game. Here, it is premised that when the game is executed, login operation to the game machine 1 has been completed and the player ID of the player to play the game has been stored in the primary storage part 13.

Figure 21:
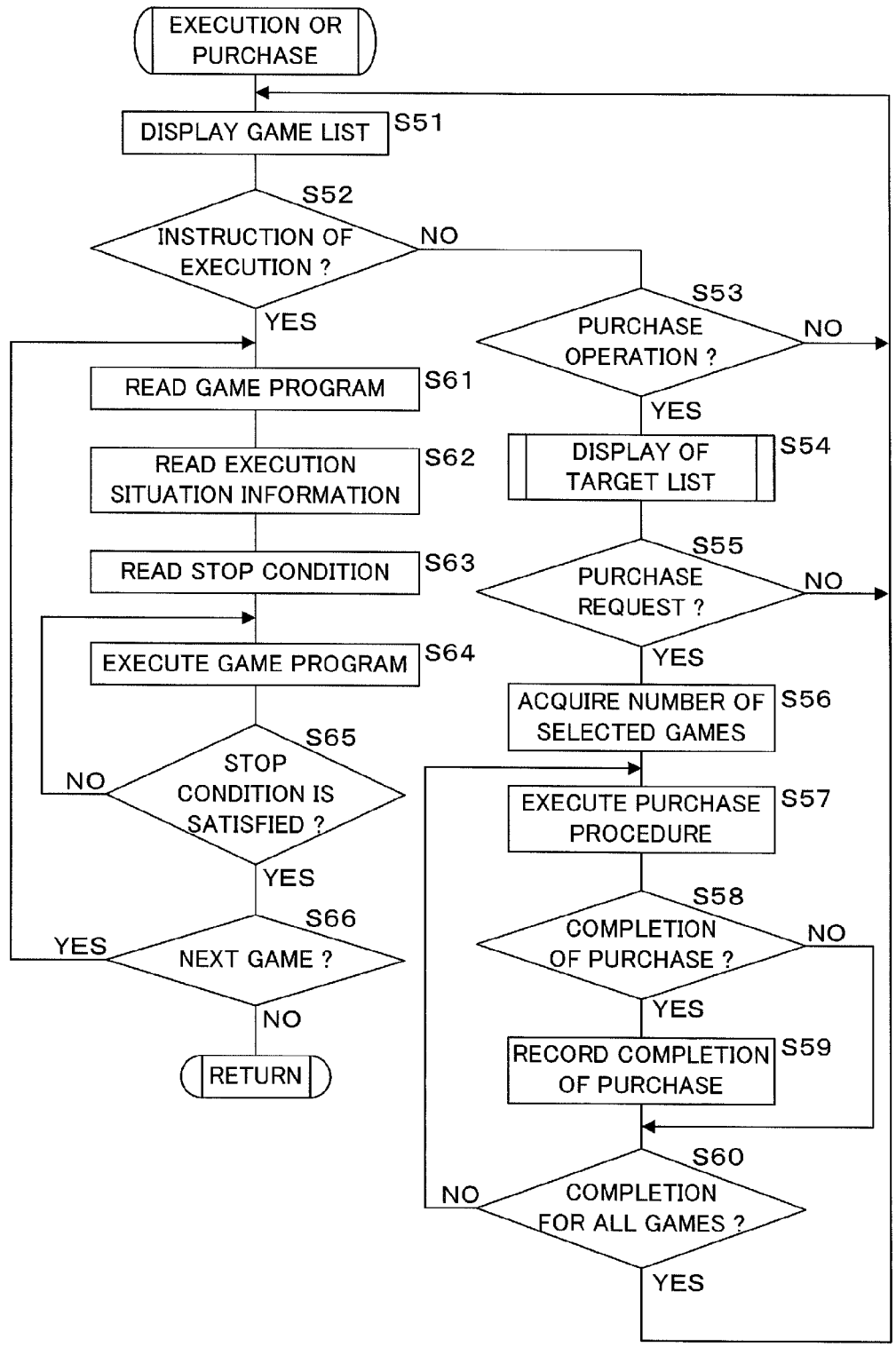
FIG. 21 shows a flow chart of processing executed by a game machine.

FIG. 21 shows a flow chart of the processing executed by the game machine 1. The following description is given mainly for difference from the processing in Embodiment 1. The processing part 10 of the game machine 1 displays a list of games executable in the game mix function (step S51). The processing part 10 judges whether game execution has been instructed (step S52). When execution has been instructed (YES at step S52), the processing part 10 executes the game (steps S61 to S66). This processing is similar to that of Embodiment 1 and hence its description is omitted.

When execution has not been instructed (NO at step S52), the processing part 10 judges whether the input is purchase operation (step S53). When the input is not purchase operation (NO at step S53), the processing part 10 returns the processing to step S51. When the input is purchase operation (YES at step S53), that is, when the "purchase" button 185 in FIG. 18B has been operated, the processing part 10 displays the list of games serving as purchase targets (step S54). Details of the list display processing is described later. Then, the processing part 10 judges whether a purchase request has been received (step S55). When a purchase request has not been received (NO at step S55), the processing part 10 returns the processing to step S51. When a purchase request has been received (YES at step S55), the processing part 10 acquires the number of games selected by the user (step S56) and then repeats the procedure necessary for the purchase in the number of times equal to the acquired value (steps S57 to S59). Steps S57 to S59 are similar to steps S45 to S47 and hence their description is omitted. The processing part 10 judges whether the processing has been completed for all selected games (step S60). When the processing has been completed not for all (NO at step S60), the processing part 10 returns the processing to step S57 so as to repeat the processing. When the processing has been completed for all (YES at step S60), the processing part 10 returns the processing to step S51.

Figure 22:
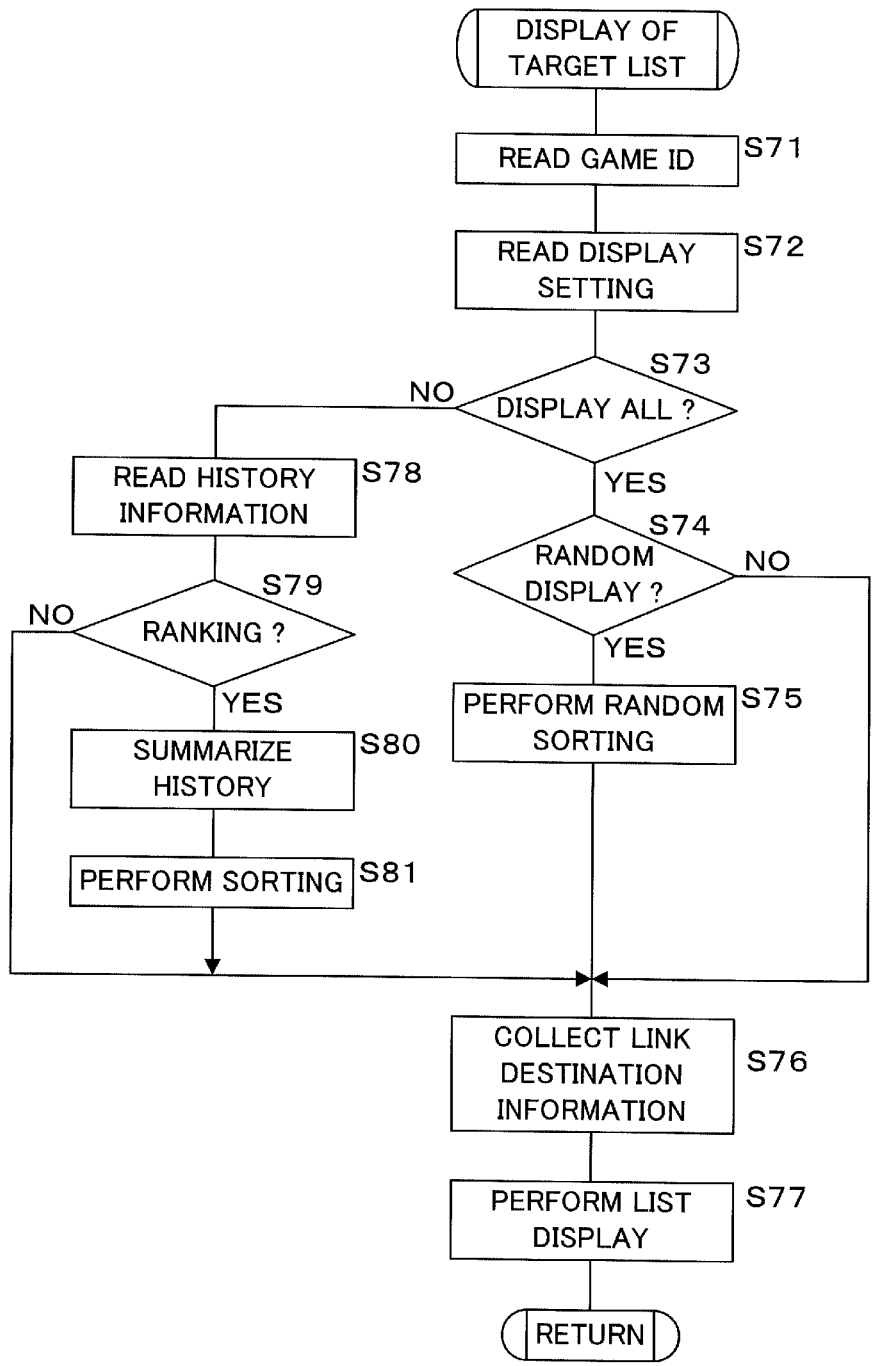
FIG. 22 shows a flow chart of the processing of generating a purchase target list.

FIG. 22 shows a flow chart of the processing of generating a purchase target list. The processing part 10 reads the game IDs of all games executable in the game mix function (step S71). The processing part 10 reads the display setting (step S72). Here, the display setting is premised to be any one of the above-mentioned (1) to (5). The processing part 10 judges whether the display setting is "display all" (step S73). When the display setting is "display all" (YES at step S73), the processing part 10 judges whether the display setting is "random display" (step S74). When the display setting is "random display" (YES at step S74), the processing part 10 performs random sorting of the game IDs acquired at step S71 (step S75). From the link information table, the processing part 10 acquires link information corresponding to the game IDs so as to collect link destination information (step S76). The processing part 10 performs list display (step S77). An example is illustrated in FIG. 19A given above. When the display setting is not "random display" (NO at step S74), the processing part 10 executes steps S76 and S77.

When the display setting is not "display all" (NO at step S73), the processing part 10 reads the history information from the history information table (step S78) so as to acquire the IDs of games having a play history. The processing part 10 judges whether the display setting is "ranking" (step S79). In the case of "ranking" (YES at step S79), the processing part 10 summarizes the history (step S80). On the basis of the summarized result, the processing part 10 sorts the game IDs (step S81). The processing part 10 executes steps S76 and S77. When the display setting is not "ranking" (NO at step S79), the processing part 10 executes steps S76 and S77.

Here, the summarization of the history is performed on the number of times of play, the play time, and the like for each game.

Further, in a case that a plurality of games are contained in one execution flow of the function of the game mix and these games alone are adopted as display targets, the game IDs of these display targets alone may be read at step S71.

As described above, in Embodiment 3, purchase of a plurality of games is allowed to be promoted. When games to be displayed as purchase targets are limited to those having a play history, or alternatively when games are displayed in descending order of the play frequency, the display achieves stronger promotion.

Further, games relevant to the history may be included into the displayed games. For example, in a case that sports games are raked in the top group in the history, other sports games outside the top group in the history may be displayed. Further, sports games not contained in the history may be displayed.

Here, for the purpose of implementation of such a function, a table is prepared in advance in which game IDs and game categories (such as shooting games, role playing games, and sports games) are in correspondence to each other.

Supplementary description is given for the structure of the game program. The structure illustrated in FIG. 9 is based on the game mix function and hence is executable only in the game mix function. Thus, when a game program has been purchased, it has been premised that the game machine 1 acquires an ordinary game program (to which the execution situation part 93 and the clearing condition part 94 are not added) through download or the like. However, employable configurations are not limited to this. That is, the game machine 1 may generate a game program by eliminating the execution situation part 93 and the clearing condition part 94 from the game program for the game mix. Alternatively, the game program may be executed in a state that the execution situation part 93 and the clearing condition part 94 are disregarded.

Here, the execution flow and the game program may be read from the recording medium 2 through the recording medium attachment part 12 or alternatively from a server or the like on a network through the wireless communication part 16.

Further, judgment of the clearing condition has been performed by using the outputted image. Instead, the judgment may be performed by checking the memory or the like of the emulator. This is because, for example, the score value, the player stock number, and the like are usually held as given variables.

Here, the game machine 1 serving as the information processing apparatus has been in the form of a single apparatus. However, employable configurations are not limited to this. That is, individual parts of the function of the game machine 1 may be provided by a plurality of apparatuses and then these apparatuses may cooperate with each other so as to implement the entirety of the function described above.

In this specification, even for each element or the like described in the singular form by using an article "a" or "an", such elements in a plural number shall be not excluded.

The game machine according to the embodiment allows a part of a game to be executed and presents link information used for accepting a purchase request for the game program, in a manner of being in correspondence to the game. Thus, the player is allowed to easily purchase a game program after checking the contents of the game.

What is claimed is:

1. A non-transitory storage medium storing an information processing program which, when executed by a computer of a first information processing apparatus, causes the computer to perform operations comprising:

reading a game program capable of being executed by a second information processing apparatus having a configuration different from that of the first information processing apparatus;

emulating the read game program using a virtual processor to emulate said different configuration of the second information processing apparatus;

restricting the emulating by (1) determining, based upon execution situation information obtained from one or more registers and/or memory of the first information processing apparatus, an execution situation of the game program being emulated, and (2) when the determined execution situation of the game program satisfies a condition set in advance, stopping processing of the game program being emulated; and displaying, after the restricting and on a display coupled to the computer, link information of a web page for accepting a request to purchase the game program.

2. The non-transitory computer-readable storage medium according to claim 1, wherein the information processing program causes the computer to perform further operations:

determining whether the game program has been purchased; and when the determining determines that the game program has been purchased, causing the emulating to be performed without the restricting.

3. The non-transitory computer-readable storage medium according to claim 1, wherein the information processing program causes the computer to perform further operations:

determining whether the game program has been purchased;

when the determining determines that the game program has been purchased, selecting whether to perform the emulating with the restricting or without the restricting; and performing the emulating according to the selection.

4. The non-transitory computer-readable storage medium according to claim 1, wherein the information processing program causes the computer to perform further operations:

read execution situation information indicating an execution situation of the game program at a specified execution position and then, by using the read execution situation information, cause the game program to be emulated with starting at the specified execution position.

5. The non-transitory computer-readable storage medium according to claim 4, wherein the information processing program causes the computer to, when the determining determines that the game program has been purchased, not read the execution situation information.

6. The non-transitory computer-readable storage medium according to claim 1, wherein the information processing program causes the computer to further perform reading one execution situation information entry from among execution situation information entries concerning a plurality of game programs, and causing emulation of a game program different from the game program whose processing has been stopped.

7. The non-transitory computer-readable storage medium according to claim 1, wherein the information processing program causes the computer to further perform emulating a plurality of game programs, and displaying link information of one or more web pages used for accepting a purchase request for each of the plurality of game programs.

8. The non-transitory computer-readable storage medium according to claim 7, wherein the information processing program cause the computer to further perform
   causing a storage device to store therein atoll a history of execution of each game program of the plurality of game programs, and
   displaying link information only for game programs for which the history of execution is stored in the storage device.

9. An information processing apparatus comprising at least one computer configured to:
   read a game program capable of being executed by another information processing apparatus having a configuration different from the information processing apparatus;
   emulate the read game program using a virtual processor to emulate said different configuration of the second information processing apparatus;
   restrict the emulating by (1) determining, based upon execution situation information obtained from one or more registers and/or memory of the first information processing apparatus, an execution situation of the game program being emulated, and (2) when the determined execution situation of the game program satisfies a condition set in advance, stopping processing of the game program being emulated; and
   display, after the restricting and on a display coupled to the computer, link information of a web page for accepting a request to purchase the game program.

10. An information processing system comprising:
   a communication interface; and
   at least one computer configured to:
   read a game program capable of being executed by another information processing system having a configuration different from the information processing apparatus;
   emulate the read game program using a virtual processor to emulate said different configuration of the second information processing apparatus;
   restrict the emulation by (1) determining, based upon execution situation information obtained from one or more registers and/or memory of the first information processing apparatus, an execution situation of the game program being emulated, and (2) when the determined execution situation of the game program satisfies a condition set in advance, stopping processing of the game program being emulated; and
   display, after the restricting and on a display coupled to the computer, link information used for accepting a purchase request for the game program.

11. An information processing method executed by an information processing apparatus, comprising:
   reading a game program capable of being executed by any other information processing apparatus having a configuration different from the own;
   emulating the read-out game program using a virtual processor to emulate said different configuration of the second information processing apparatus;
   restricting the emulation by (1) determining, based upon execution situation information obtained from one or more registers and/or memory of the first information processing apparatus, an execution situation of the game program being emulated, and (2) when the determined execution situation of the game program satisfies a condition set in advance, stopping processing of the game program being emulated; and
   displaying, after the restricting and on a display coupled to the computer, link information used for accepting a purchase request for the game program.

* * * * *